US009706171B1

(12) United States Patent
Riley et al.

(10) Patent No.: US 9,706,171 B1
(45) Date of Patent: Jul. 11, 2017

(54) POLYPTYCH VIEW INCLUDING THREE OR MORE DESIGNATED VIDEO STREAMS

(71) Applicant: Microsoft Technology Licensing, LLC, Redmond, WA (US)

(72) Inventors: Raymond Walter Riley, Bainbridge Island, WA (US); Kae-Ling Gurr, Seattle, WA (US); Brett Delainey Christie, Seattle, WA (US); Joshua D. Maruska, Seattle, WA (US); Joshua Noble, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/071,110

(22) Filed: Mar. 15, 2016

(51) Int. Cl.
*H04N 7/15* (2006.01)
*H04N 7/14* (2006.01)
*G10L 25/78* (2013.01)
*G10L 25/57* (2013.01)

(52) U.S. Cl.
CPC ............ *H04N 7/152* (2013.01); *G10L 25/57* (2013.01); *G10L 25/78* (2013.01); *H04N 7/142* (2013.01); *G10L 2025/783* (2013.01)

(58) Field of Classification Search
CPC  H04N 7/15; H04N 7/152; H04N 7/14; H04N 7/147
USPC ........................................... 348/14.01–14.16
See application file for complete search history.

(56) References Cited

U.S. PATENT DOCUMENTS

| 8,111,282 | B2 | 2/2012 | Cutler et al. |
| 8,537,196 | B2 | 9/2013 | Hegde et al. |
| 8,624,955 | B2 | 1/2014 | Watson et al. |
| 8,670,018 | B2 | 3/2014 | Cunnington et al. |
| 8,798,252 | B2 | 8/2014 | Krantz et al. |
| 2004/0254982 | A1 | 12/2004 | Hoffman et al. |
| 2009/0210789 | A1 | 8/2009 | Thakkar et al. |
| 2009/0220065 | A1 | 9/2009 | Ahuja et al. |
| 2010/0309284 | A1* | 12/2010 | Samadani .............. G06Q 10/10 348/14.08 |
| 2012/0026277 | A1* | 2/2012 | Malzbender ............. H04N 7/15 348/14.07 |
| 2012/0079399 | A1 | 3/2012 | Ferman et al. |

(Continued)

OTHER PUBLICATIONS

"Integrating the Polycom CX5000 with Polycom Video Systems", In White Paper of Polycom, Apr. 2009, pp. 1-18.

*Primary Examiner* — Melur Ramakrishnaiah
(74) *Attorney, Agent, or Firm* — Wade IP Law LLC

(57) ABSTRACT

Techniques are described herein that are capable of providing a polyptych view that includes three or more designated video streams. A polyptych view is a view that includes multiple discrete sections. Each section includes a respective designated video stream. A designated video stream is a video stream of a participant of a video conference who is identified to be a designated participant in the context of the video conference. For example, a participant of a video conference may become a designated participant by speaking for at least a first threshold duration of time during the video conference and/or having a priority greater than or equal to a priority threshold. In another example, a participant may no longer be deemed a designated participant if the participant does not speak for a second threshold duration of time, speaks less than others, and/or has a priority that is less than others.

21 Claims, 10 Drawing Sheets

(56) References Cited

U.S. PATENT DOCUMENTS

| | | | |
|---|---|---|---|
| 2012/0081503 A1* | 4/2012 | Leow | H04N 7/142 348/14.07 |
| 2012/0182381 A1* | 7/2012 | Abate | H04L 12/1822 348/14.03 |
| 2013/0169742 A1* | 7/2013 | Wu | H04N 7/152 348/14.08 |
| 2014/0104374 A1 | 4/2014 | Buckler | |
| 2014/0118472 A1 | 5/2014 | Liu et al. | |
| 2015/0049162 A1 | 2/2015 | Kurupacheril et al. | |
| 2015/0179186 A1 | 6/2015 | Swierk et al. | |

* cited by examiner

POLYPTYCH VIEW INCLUDING THREE OR MORE DESIGNATED VIDEO STREAMS

BACKGROUND

Video conferencing systems enable participants of a video conference who are at different locations to communicate using two-way video and audio transmissions. For instance, the video conference may be hosted by participants in a conference room (a.k.a. in-room participants), and the video conferencing system may enable the in-room participants to communicate in real-time with other participants (e.g., remote participants) who are not in the conference room. A video camera is often positioned in the conference room to capture images of the in-room participants. Many traditional video cameras have a field of view that is too narrow to capture all of the in-room participants unless the in-room participants are located in a designated portion of the conference room that corresponds to the field of view.

360-degree video cameras have become increasingly popular in recent years for use in video conferences because such cameras are intended to have a 360-degree field of view that is capable of capturing all of the in-room participants. Even with the use of a 360-degree video camera, the remote participants often are presented with a screen that shows a single continuous camera view that includes one or more of the in-room participants.

If the single continuous camera view captures all of the in-room participants, the remote participants may not be able to distinguish interactions that occur between the in-room participants shown on the screen. For instance, the remote participants may not be able to distinguish who is speaking and/or with whom the speaker is directing the speech. The remote participants may not be able to distinguish gestures (e.g., hand gestures, head nods, pointing) of the in-room participants. On the other hand, if the single continuous camera view focuses on certain in-room participants to the exclusion of other in-room participants, the remote participants are unable to see the other in-room participants and may therefore miss interactions of the other in-room participants.

SUMMARY

Various approaches are described herein for, among other things, providing a polyptych view that includes three or more designated video streams. A polyptych view is a view that includes multiple discrete sections. Each section includes a respective designated video stream. A designated video stream is a video stream of a participant of a video conference who is identified to be a designated participant in the context of the video conference. For example, a participant of a video conference may be identified as a designated participant based on the participant speaking for at least a first threshold duration of time during the video conference and/or having a priority that is greater than or equal to a priority threshold. In another example, a participant may no longer be identified as a designated participant based on the participant not speaking for at least a second threshold duration of time, speaking less than another participant who is identified as a designated participant during a designated period of time, and/or having a priority that is less than a priority of another participant who is identified as a designated participant.

In an example approach, three or more designated participants are selected from participants of a video conference based on a priority of each participant and/or a speaker metric of each participant. The participants include first participants and second participant(s). The first participants are in a field of view of a 360-degree camera that is configured to provide a 360-degree video stream that includes portions that correspond to the first participants based on the field of view. The second participant(s) are not in the field of view of the 360-degree camera. The three or more designated participants include one or more designated first participants that are included in the first participants. The three or more designated video streams of the three or more respective designated participants are combined to form the polyptych view for presentation on a display of a computing device of a specified participant that is included in the second participant(s). The three or more designated video streams comprise one or more first video streams of the one or more respective designated first participants. The one or more first video streams are one or more respective portions of the 360-degree video stream.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
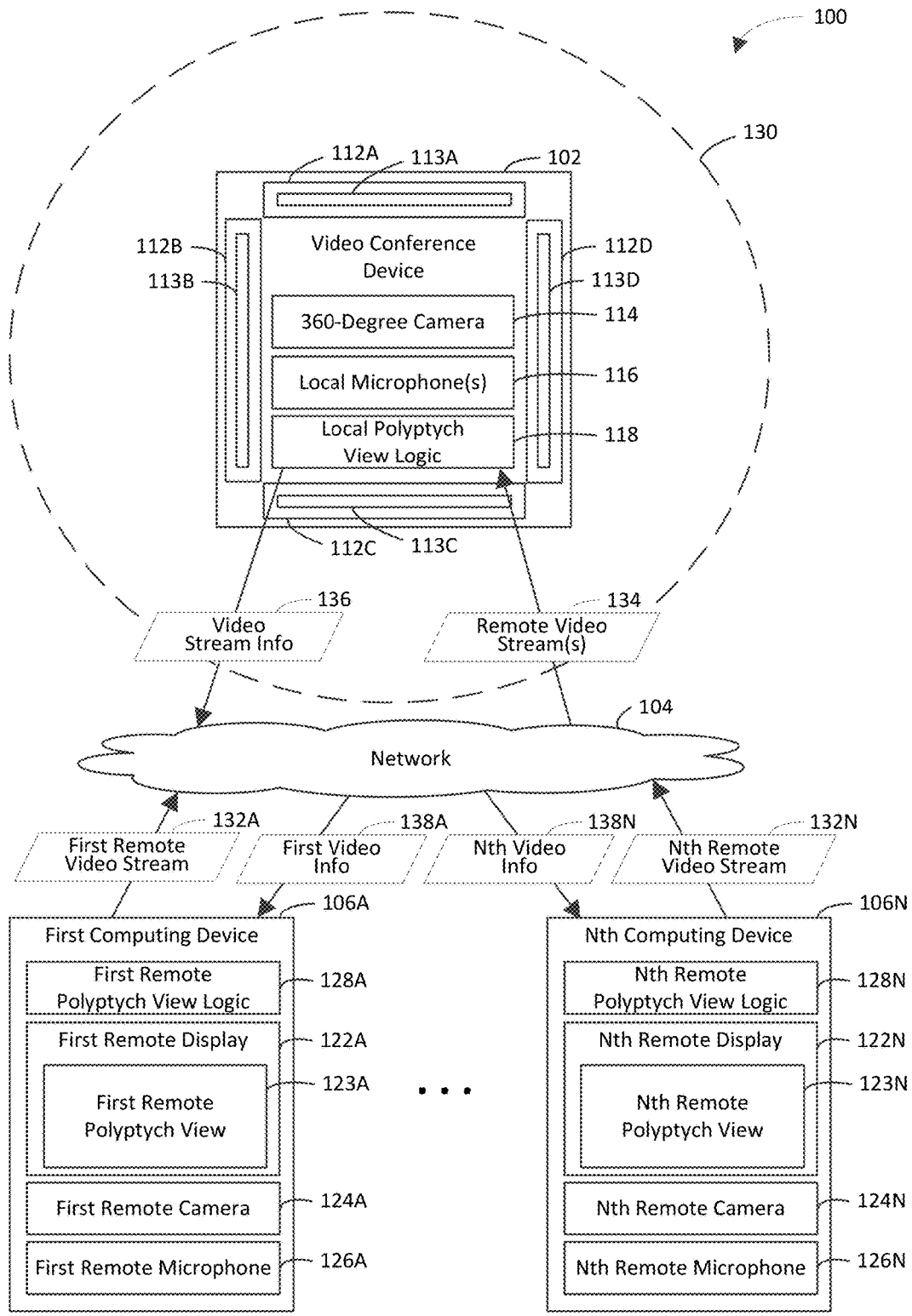
FIG. 1 is a block diagram of an example polyptych view system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of providing a polyptych view that includes three or more designated video streams. For instance, a polyptych view that includes three designated video streams is referred to as a triptych view. A polyptych view that includes four designated video streams is referred to as a tetraptych view or a quadriptych view. A polyptych view that includes five designated video streams is referred to as a pentaptych view, and so on. A polyptych view is a view that includes multiple discrete sections. Each section includes a respective designated video stream. A designated video stream is a video stream of a participant of a video conference who is identified to be a designated participant in the context of the video conference. For example, a participant of a video conference may be identified as a designated participant based on the participant speaking for at least a first threshold duration of time during the video conference and/or having a priority that is greater than or equal to a priority threshold. In another example, a participant may no longer be identified as a designated participant based on the participant not speaking for at least a second threshold duration of time, speaking less than another participant who is identified as a designated participant during a designated period of time, and/or having a priority that is less than a priority of another participant who is identified as a designated participant.

Example techniques described herein have a variety of benefits as compared to conventional techniques for providing video of participants of a video conference. For instance, the example techniques may increase efficiency of communication among participants of a video conference. The example techniques may increase user efficiency (e.g., ability of the user to identify a speaker, a gesture of the speaker, person(s) to whom the speaker speaks and/or gestures) and/or user interaction performance (e.g., more natural gaze) during the video conference. The example techniques may increase efficiency of a first computing device that provides video of participants to a remote participant and/or a second computing device of the remote participant that processes the video for display to the remote participant. The example techniques may reduce an amount of time and/or resources (e.g., processor, memory, network bandwidth) that are consumed to provide video of participants of a video conference. For instance, all portions of a 360-degree video stream need not necessarily be provided to a remote participant of the video conference.

FIG. 1 is a block diagram of an example polyptych view system 100 in accordance with an embodiment. Generally speaking, polyptych view system 100 operates to provide a polyptych view that includes three or more designated video streams. Polyptych view system 100 may provide a single polyptych view or multiple polyptych views which may be the same or different. As shown in FIG. 1, polyptych view system 100 includes a video conference device 102, a network 104, and a plurality of computing devices 106A-106N. Communication among video conference device 102 and computing devices 106A-106N is carried out over network 104 using well-known network communication protocols. Network 104 may be a wide-area network (e.g., the Internet), a local area network (LAN), another type of network, or a combination thereof.

Video conference device 102 is a processing system that is capable of communicating with computing devices 106A-106N. An example of a processing system is a system that includes at least one processor that is capable of manipulating data in accordance with a set of instructions. For instance, a processing system may be a computer, a game console, a personal digital assistant, etc. Video conference device 102 also may be referred to as a computing device. Video conference device 102 is configured to facilitate communication among participants of a video conference. Video conference device 102 includes displays 112A-112D, a 360-degree camera 114, local microphone(s) 116, and local polyptych view logic 118. Displays 112A-112D are configured to display respective polyptych views 113A-113D. It may be desirable for the polyptych views 113A-113D to be the same, though any one or more of the polyptych views 113A-113D may be different from other(s) of the polyptych views 113A-113D.

360-degree camera 114 is configured to capture an image (e.g., an image stream), which shows participants of the video conference who are within a field of view 130 of 360-degree camera 114. The participants of the video conference who are within the field of view 130 are referred to herein as "local participants" for illustrative purposes and are not intended to be limiting. For instance, the local participants may be in a conference room. In one example, the field of view 130 may extend a designated (e.g., predetermined) radius from 360-degree camera 114. In another example, the field of view 130 may extend to the walls of a room in which the local participants are located.

360-degree camera 114 is further configured to generate a 360-degree video stream that includes multiple portions that correspond to the respective local participants based on the image that is captured by 360-degree camera 114. For example, the portions may be discrete (e.g., disjoint) portions of the image. In accordance with this example, the portion of the image that corresponds to each local participant may be configured to frame that local participant (e.g., an upper torso or a face of that local participant). For instance, the portion of the image that corresponds to each local participant may be configured to exclude the other local participants.

Local microphone(s) 116 are configured to receive speech of the local participants and other sounds that are audible to a human (e.g., frequencies in a range of 20 Hertz to 20,000 Hertz).

Local polyptych view logic 118 is configured to perform one or more of the operations described herein to provide a polyptych view (e.g., any one or more of polyptych views 113A-113D and/or any one or more of remote polyptych views 123A-123N, which are discussed in further detail below). For example, local polyptych view logic 118 may receive remote video stream(s) 134 from one or more of computing devices 106A-106N. In accordance with this example, the remote video stream(s) 134 may include any one or more of the remote video streams 132A-132N from respective computing devices 106A-106N. The remote video streams 132A-132N are described in further detail below. In further accordance with this example, local polyptych view logic 118 may generate video stream information 136 based on the remote video stream(s) 134 and/or one or more portions of the 360-degree video stream.

Video stream information 136 may include video information 138A-138N for respective computing devices 106A-106N. For example, each of the video information 138A-138N may include a respective combination of one or more of the remote video stream(s) 134 and/or one or more of the portions of the 360-degree video stream. Each of the combinations may be the same as or different from any one or more others of the combinations.

Local polyptych view logic 118 may determine which of the local participants and which of the participants who are associated with computing devices 106A-106N are designated participants. The participants who are associated with computing devices 106A-106N are not within the field of view 130 of 360-degree camera 114. The participants who are associated with computing devices 106A-106N are referred to herein as "remote participants" for illustrative purposes and are not intended to be limiting.

Local polyptych view logic 118 may determine whether a participant of the video conference is a designated participant based on a priority of the participant and/or a speaker metric of the participant. A speaker metric of a participant provides information regarding speech of the participant. Examples of a speaker metric include but are not limited to an indication that the participant speaks for at least a first threshold duration of time during the video conference, an indication that the participant does not speak for at least a second threshold duration of time, and an indication that the participant speaks less than other participant(s) who are identified as designated participant(s) during a designated period of time. It will be recognized that a threshold duration may be a fixed duration or a relative duration that is relative to a duration for which at least one other participant speaks or does not speak during the video conference. It will be further recognized that the priority of the participant may be a fixed priority or a relative priority that is relative to a priority of at least one other participant.

Local polyptych view logic 118 may select the designated participants or a subset thereof and combine designated video streams of the selected designated participants to form the polyptych view. For example, local polyptych view logic 118 may combine three or more of the remote video stream(s) 134 to form the polyptych views 113A-113D. In accordance with this example, the polyptych views 113A-113D may not include any of the portions of the 360-degree video stream. In another example, local polyptych view logic 118 may combine three or more of the portions of the 360-degree video stream to provide each of the remote polyptych views 123A-123N. In yet another example, local polyptych view logic 118 may combine one or more of the portions of the 360-degree video stream and one or more of the remote video stream(s) 134 to provide one or more of the remote polyptych views 123A-123N.

A video stream of a remote participant who is a designated participant may not be included in the remote polyptych view that is shown on the computing device of that remote participant. For example, the first video information 138A may include one or more of the portions of the 360-degree video stream and one or more of the remote video stream(s) 134 other than (e.g., except for) the first remote video stream 132A. In accordance with this example, local polyptych view logic 118 may combine one or more of the portions of the 360-degree video stream and one or more of the remote video stream(s) 134 other than (e.g., except for) the first remote video stream 132A to provide the remote polyptych view 123A.

It will be recognized that the video stream of a remote participant who is a designated participant may be shown as an overlay on the polyptych view that is presented on the computing device of that remote participant (e.g., as a picture-in-picture stream). However, a video stream that is overlaid on the polyptych view is not considered to be included in the polyptych view. For instance, the polyptych view may be configured such that none of the designated video streams in the polyptych view occlude any others of the designated video streams in the polyptych view.

Computing devices 106A-106N are processing systems that are capable of communicating with video conference device 102. Computing devices 106A-106N include respective remote displays 122A-122N, remote cameras 124A-124N, remote microphones 126A-126N, and remote polyptych view logic 128A-128N.

Remote displays 122A-122N are configured to display respective polyptych views 123A-123N. Any one or more of the polyptych views 123A-123N may be different from other(s) of the polyptych views 123A-123N. Any two or more of the polyptych views 123A-123N may be the same.

Remote cameras 124A-124N are configured to capture views of respective remote participants. For example, first remote camera 124A may be configured to capture a view of a first remote participant who owns or otherwise has access to first computing device 106A. In another example, Nth remote camera 124N may be configured to capture a view of an Nth remote participant who owns or otherwise has access to Nth computing device 106N. Remote cameras 124A-124N are further configured to generate respective remote video streams 132A-132N based on the respective views that are captured by respective remote cameras 124A-124N.

Remote microphones 126A-126N are configured to receive speech of the respective remote participants and other sounds that are audible to a human.

Remote polyptych view logic 128A-128N are configured to perform one or more of the operations described herein to provide respective polyptych views 123A-123N. For example, first video information 138A may include three or more of the portions of the 360-degree video stream. In accordance with this example, first remote polyptych view logic 128A may combine three or more of the portions of the 360-degree video stream to provide the remote polyptych view 123A. In another example, first video information 138A may include one or more of the portions of the 360-degree video stream and one or more of the remote video stream(s) 134. In accordance with this example, first remote polyptych view logic 128A may combine one or more of the portions of the 360-degree video stream and one or more of the remote video stream(s) 134 to provide the remote polyptych view 123A.

Computing devices 106A-106N may include any client-enabled system or device, including but not limited to a desktop computer, a laptop computer, a tablet computer, a personal digital assistant, a cellular telephone, a wearable device, or the like.

Example techniques for providing a polyptych view that includes three or more designated video streams are discussed in greater detail below with reference to FIGS. 2-9.

Local polyptych view logic 118 and/or any of remote polyptych view logic 128A-128N may be implemented in various ways to provide a polyptych view that includes three or more designated video streams, including being implemented in hardware, software, firmware, or any combination thereof. For example, local polyptych view logic 118 and/or any of remote polyptych view logic 128A-128N may be implemented as computer program code configured to be executed in one or more processors. In another example, local polyptych view logic 118 and/or any of remote polyptych view logic 128A-128N may be implemented as hardware logic/electrical circuitry. For instance, local polyptych view logic 118 and/or any of remote polyptych view logic 128A-128N may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2:
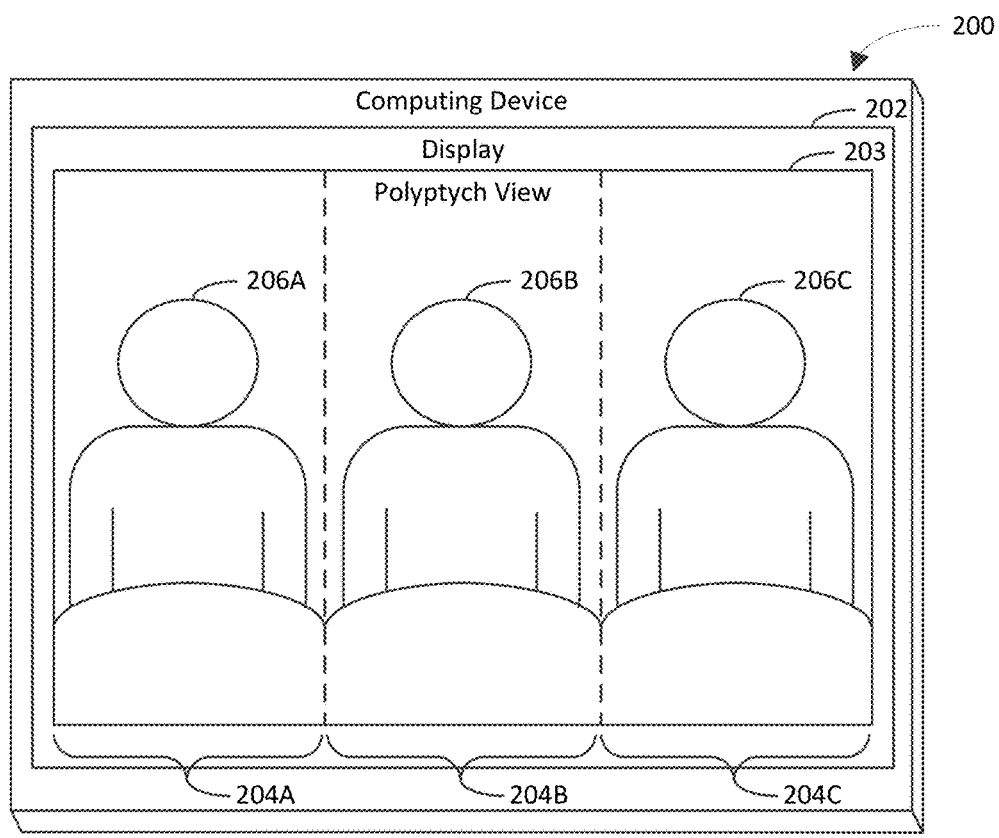
FIGS. 2 and 4 are block diagrams of example computing devices showing polyptych views having three designated video streams in accordance with embodiments.

FIG. 2 is a block diagram of an example computing device 200 having a display 202 that shows a polyptych view 203 having three designated video streams in accordance with an embodiment. The polyptych view 203 includes three sections 204A-204C, which include designated video streams of respective participants 206A-206C. For instance, participants 206A-206C may have been identified as designated participants of a video conference, and the designated video streams of the respective participants 206A-206C may have been combined to form the polyptych view 203.

In one example, the participants 206A-206C may be local participants, as described above with reference to FIG. 1. In another example, the participants 206A-206C may be remote participants, as described above with reference to FIG. 1. In yet another example, the participants 206A-206C may include one or more local participants and one or more remote participants. In an example implementation, participants 206A and 206B may be local participants, and participant 206C may be a remote participant. In accordance with this implementation, approximately two-thirds of the polyptych view 203 may be allocated for designated participants who are local participants, and approximately one-third of the polyptych view 2023 may be allocated for designated participants who are remote participants. In another example implementation, approximately one-half of the polyptych view 203 may be allocated for designated participants who are local participants, and approximately one-half of the polyptych view 2023 may be allocated for designated participants who are remote participants. In yet another implementation, an approximately equal proportion of the polyptych view 203 may be allocated for each designated participant regardless whether the designated participant is a local participant or a remote participant.

The sections 204A-204C are shown to form respective columns in the polyptych view 203 for illustrative purposes and are not intended to be limiting. It will be recognized that the sections 204A-204C may form respective rows in the polyptych view 203. The sections 204A-204C may have any suitable shape, including but not limited to rectangles (as shown in FIG. 2), squares, sectors, and tringles. Sections of a polyptych view that are shaped as sectors or triangles may meet at a common point in the polyptych view (e.g., the center of the polyptych view). For instance, the sectors or tringles may resemble slices of a pie.

Figure 3:
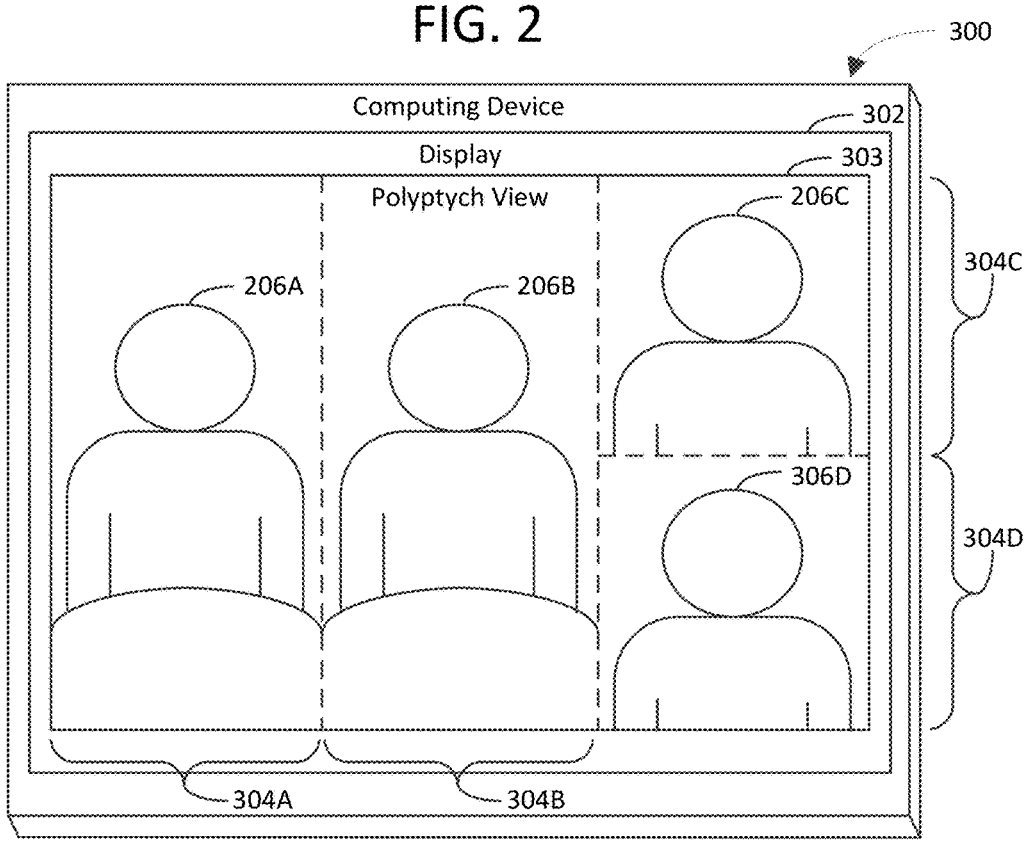
FIG. 3 is a block diagram of an example computing device showing a polyptych view having four designated video streams in accordance with an embodiment.

FIG. 3 is a block diagram of an example computing device 300 having a display 302 that shows a polyptych view 303 having four designated video streams in accordance with an embodiment. The polyptych view 303 includes four sections 304A-304D, which include designated video streams of respective participants 206A-206C and 306D. The polyptych view 303 includes three columns for illustrative purposes. The first column includes section 304A. The second column includes section 304B. The third column includes sections 304C and 304D. Sections 304C and 304D are positioned in respective rows of the third column. In an example implementation, participants 206A and 206B are local participants, and participants 206C and 306D are remote participants, though it will be recognized that each of the participants 206A-206C and 306D may be a local participant or a remote participant.

For purposes of illustration, assume that while the designated video streams of the respective participants 206A-206C are shown in the polyptych view 203 of FIG. 2, a determination is made that participant 306D speaks for at least a threshold duration of time. The designated video stream of participant 306D may be added to the polyptych view 203 of FIG. 2 to provide the polyptych view 303 shown in FIG. 3 in response to the determination. In the example implementation described above, participants 206A and 206B are local participants, and participants 206C and 306D are remote participants. In accordance with this implementation, the designated video stream of participant 306D may be added to the third column based on the third column being allocated for designated participants who are remote participants.

Figure 4:
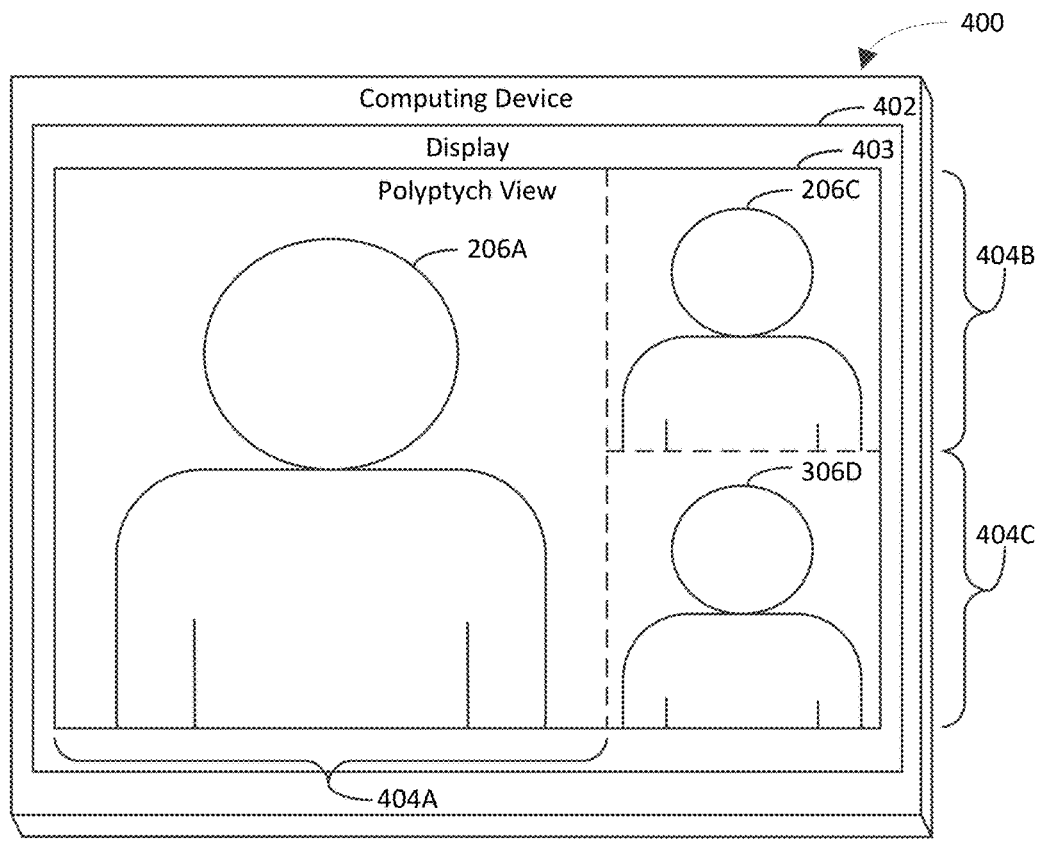

FIG. 4 is a block diagram of another example computing device 300 having a display 402 that shows a polyptych view 403 having three designated video streams in accordance with an embodiment. The polyptych view 403 includes three sections 404A-404C, which include designated video streams of respective participants 206A, 206C, and 306D. Section 404A occupies a first portion of the polyptych view 403. Sections 404B and 404C occupy a second portion of the polyptych view 403 that is adjacent to the first portion. Sections 404B and 404C occupy adjacent sub-portions of the second portion.

For purposes of illustration, assume that while the designated video streams of the respective participants 206A-206C and 306D are shown in the polyptych view 303 of FIG. 3, a determination is made that participant 206B does not speak for at least a threshold duration of time. The designated video stream of participant 206B may be removed from the polyptych view 303 of FIG. 3 to provide the polyptych view 403 shown in FIG. 4 in response to the determination. As depicted in FIG. 4, when the designated video stream of participant 206B is removed from the first column of the polyptych view 303 of FIG. 3, the designated video stream of participant 206A may be enlarged to occupy both the first column and the second column of the polyptych view 303, resulting in the polyptych view 403 of FIG. 4.

If a determination is subsequently made that participant 206A does not speak for at least a threshold duration of time, the designated video stream of participant 206A may be removed from the polyptych view 403 to provide a revised polyptych view. For example, the designated video streams of respective participants 206C and 306D may be enlarged to occupy an entirety of the revised polyptych view in response to the designated video stream of participant 206A being removed from the polyptych view 403. When the designated video streams of respective participants 206C and 306D are enlarged, the designated video streams of respective participants 206C and 306D may be positioned in respective rows or respective columns of the revised polyptych view.

FIGS. 5-10 depict flowcharts 500, 600, 700, 800, 900, and 1000 of example methods for providing a polyptych view that includes three or more designated video streams in accordance with embodiments. Flowcharts 500, 600, 700, 800, 900, and 1000 may be performed by video conference device 102 and/or any one or more of computing devices 106A-106N shown in FIG. 1, for example. For illustrative purposes, flowcharts 500, 600, 700, 800, 900, and 1000 are described with respect to computing device(s) 1100 shown in FIG. 11. For instance, computing device(s) 1100 may be an example implementation of video conference device 102 and/or any one or more of computing devices 106A-106N shown in FIG. 1. As shown in FIG. 11, computing device(s) 1100 include polyptych view logic 1102, display(s) 1104, and camera(s) 1106. Polyptych view logic 1102 includes selection logic 1108, combination logic 1110 and division logic 1124. Combination logic 1110 includes inclusion determination logic 1112, removal logic 1114, addition logic 1116, identification logic 1118, provision logic 1120, and comparison logic 1122. Further structural and operational embodiments will be apparent to persons skilled in the relevant art(s) based on the discussion regarding flowcharts 500, 600, 700, 800, 900, and 1000.

Figure 5:
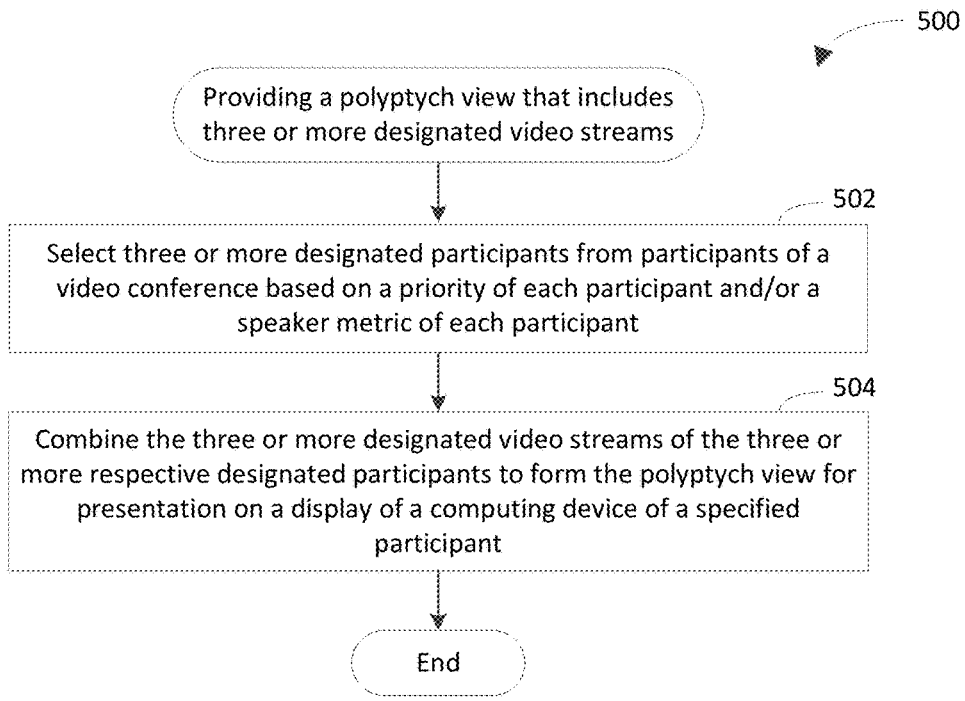
FIGS. 5-10 depict flowcharts of example methods for providing a polyptych view that includes three or more designated video streams in accordance with embodiments.

As shown in FIG. 5, the method of flowchart 500 begins at step 502. In step 502, three or more designated participants are selected from participants of a video conference based on a priority of each participant and/or a speaker metric of each participant. For example, the three or more designated participants may be selected based on each of the three or more designated participants speaking for at least a threshold duration of time and/or having a priority that is greater than priorities of others of the participants who are not included in the three or more designated participants. In accordance with this example, the three or more designated participants may be selected from the participants further based on the others of the participants not speaking for at least the threshold duration of time. The threshold duration of time may be any suitable duration of time, including but not limited to half of a second, three quarters of a second, and one second. In further accordance with this example, the priority of at least one of the three or more designated participants may be based on a role and/or a title of the respective designated participant. In further accordance with this example, the priority of at least one of the three or more designated participants may be based on selection of the respective designated participant by another participant (e.g., a specified participant for whom the polyptych view is to be formed).

The participants include first participants and second participant(s). The first participants are in a field of view of a 360-degree camera that is configured to provide a 360-degree video stream that includes portions that correspond to the respective first participants based on the field of view. The second participant(s) are not in the field of view of the 360-degree camera. The second participant(s) may be in a field of view of one or more second cameras, though the scope of the example embodiments is not limited in this respect. The three or more designated participants include designated first participant(s) that are included in the first participants.

In an example implementation, selection logic 1108 selects the three or more designated participants from the participants of the video conference. For example, selection logic 1108 may analyze communication 1126 of the participants to determine whether each of the participants speaks for at least the threshold duration of time. The communication 1126 may include speech of the participants, video of the participants, etc. In accordance with this example, selection logic 1108 may include a timer that is configured to measure a duration of time of each instance of speech that occurs during the video conference. Selection logic 1108 may compare the measured durations to the threshold duration to determine one or more of the designated participants. In another example, selection logic 1108 may analyze priority information 1128 to determine a priority of each of the participants. In accordance with this example, selection logic 1108 may compare the priorities of the participants to determine one or more of the designated participants. For instance, selection logic 1108 may compare the priorities of the participants to determine which of the participants has a priority that is greater than priorities of other participants who are not included in the three or more designated participants.

Selection logic 1108 may generate designated participant information 1130 based on selection of the three or more designated participants from the participants of the video conference. The designated participant information 1130 may indicate which of the participants are included in the three or more designated participants. Accordingly, the designated participant information 1130 may distinguish the three or more designated participants from others of the participants.

At step 504, the three or more designated video streams of the three or more respective designated participants are combined to form the polyptych view for presentation on a display of a computing device of a specified participant. For instance, the specified participant may be included in the second participant(s). The three or more designated video streams include first video stream(s) of the respective designated first participant(s). The first video stream(s) are respective portion(s) of the 360-degree video stream. For instance, the first video stream(s) may include fewer than all of the portions of the 360-degree video stream. Accordingly, the first video stream(s) may correspond to less than all of the field of view.

In an example implementation, combination logic 1110 combines the three or more designated video streams to form the polyptych view 1144 for presentation on the display (e.g., any of display(s) 1104) of the computing device of the specified participant. In accordance with this implementation, combination logic 1110 may receive video streams 1138, which include remote video streams 1134 and portions 1136 of a 360-degree video stream 1132. In further accordance with this implementation, combination logic 1110 may extract the three or more designated video streams from the video streams 1138 for inclusion in the polyptych view 1144 based on the designated participant information 1130. For example, combination logic 1110 may extract the three or more designated video streams and not others of the video streams 1130 from the video streams 1130 for inclusion in the polyptych view 1144.

In an example embodiment, the second participant(s) include multiple second participants. In accordance with this embodiment, the three or more designated participants further include designated second participant(s) of the second participants. In further accordance with this embodiment, the designated second participant(s) do not include the specified participant. In an aspect of this embodiment, the three or more designated participants include at least two designated second participants of the second participants. In accordance with this aspect, the at least two designated second participants do not include the specified participant.

In another example embodiment, the three or more designated participants include at least two designated first participants of the first participants. In accordance with this embodiment, the three or more designated video streams include at least two first video streams of the at least two respective designated first participants. In further accordance with this embodiment, the at least two first video streams are at least two respective portions of the 360-degree video stream.

In yet another example embodiment, each portion of the 360-degree video stream is configured to be a video headshot of the first participant to which the respective portion corresponds. For instance, each portion may include a face of the first participant to which the respective portion corresponds and no faces of others of the first participants.

In still another example embodiment, selecting the three or more designated participants includes selecting a first designated participant who has a first priority from the participants based on the first designated participant speaking for at least a first threshold duration of time that is associated with the first priority. In accordance with this embodiment, selecting the three or more designated participants further includes selecting a second designated participant who has a second priority from the participants based on the second designated participant speaking for at least a second threshold duration of time that is associated with the second priority. In further accordance with this embodiment, the second priority is greater than the first priority. In further accordance with this embodiment, the second threshold duration of time is less than the first threshold duration of time.

In some example embodiments, one or more steps 502 and/or 504 of flowchart 500 may not be performed. Moreover, steps in addition to or in lieu of steps 502 and/or 504 may be performed. For instance, in an example embodiment, the method of flowchart 500 further includes monitoring communication among the participants. In accordance with this embodiment, selecting the three or more designated participants includes selecting the three or more designated participants from the participants based on an analysis of the communication indicating that each of the three or more designated participants speaks for at least the threshold duration of time. In an aspect, selecting the three or more designated participants includes selecting the three or more designated participants from the participants further based on the analysis of the communication indicating that others of the participants do not speak for at least the threshold duration of time.

For example, selection logic 1108 may monitor communication 1126 among the participants. In accordance with this example, selection logic 1108 may analyze the communication 1126 to determine whether each of the participants speaks for at least the threshold duration of time. In further accordance with this example, selection logic 1108 may select the three or more designated participants from the participants based on the analysis of the communication 1126 indicating that each of the three or more designated participants speaks for at least the threshold duration of time.

In another example embodiment, the method of flowchart 500 further includes capturing an image (e.g., a 360-degree view), which shows the first participants. For instance, camera(s) 1106 may capture the image. In accordance with this embodiment, the method of flowchart 500 further includes providing the 360-degree video stream to include the portions of the 360-degree video stream based on the image showing the respective first participants. For instance, camera(s) 1106 may provide the 360-degree video stream 1132 to include the portions 1136 based on the image showing the respective first participants. It will be recognized that camera(s) 1106 need not necessarily capture the image and/or provide the 360-degree video stream 1132, as depicted by the dashed line leading from camera(s) 1106 in FIG. 11.

In yet another example embodiment, the method of flowchart 500 further includes dividing the 360-degree video stream into the portions based on the respective first participants. For instance, division logic 1124 may divide the 360-degree video stream into the portions 1136 based on the respective first participants. In accordance with this embodiment, the method of flowchart 500 further includes determining whether each of the portions is to be included in the polyptych view based on whether the three or more designated participants include the first participant to which the respective portion corresponds. For example, inclusion determination logic 1112 may determine whether each of the portions 1136 is to be included in the polyptych view 1144 based on whether the three or more designated participants include the first participant to which the respective portion corresponds. In accordance with this example, inclusion determination logic 1112 may analyze the designated participant information 1130 to determine which of the participants is included in the three or more designated participants. In further accordance with this example, inclusion determination logic may map identifying information associated with the participants to the portions 1136 to provide an identity map. For instance, the identifying information may be retrieved from a store (e.g., a database), which may be included in the computing device(s) 1100 or external to the computing device(s) 1100. In further accordance with this example, inclusion determination logic 1112 may compare the designated participant information 1130 and the identity map to determine whether each of the portions 1136 is to be included in the polyptych view 1144 based on whether the three or more designated participants include the first participant to which the respective portion corresponds.

In still another example embodiment, the method of flowchart 500 further includes determining that an identified designated participant of the three or more designated participants does not speak for at least a threshold duration of time. The threshold duration of time may be any suitable duration of time, including but not limited to 10 seconds, 30 seconds, one minute, or two minutes. For instance, selection logic 1108 may determine that the identified designated participant does not speak for at least the threshold duration of time. In accordance with this embodiment, the method of flowchart 500 further includes removing the designated video stream of the identified designated participant from the polyptych view in response to the determination. For instance, removal logic 1114 may remove the designated video stream of the identified designated participant from the polyptych view 1144. Accordingly, the identified designated participant may no longer be identified as a designated participant in response to determining that the identified designated participant does not speak for at least the threshold duration of time.

Figure 6:
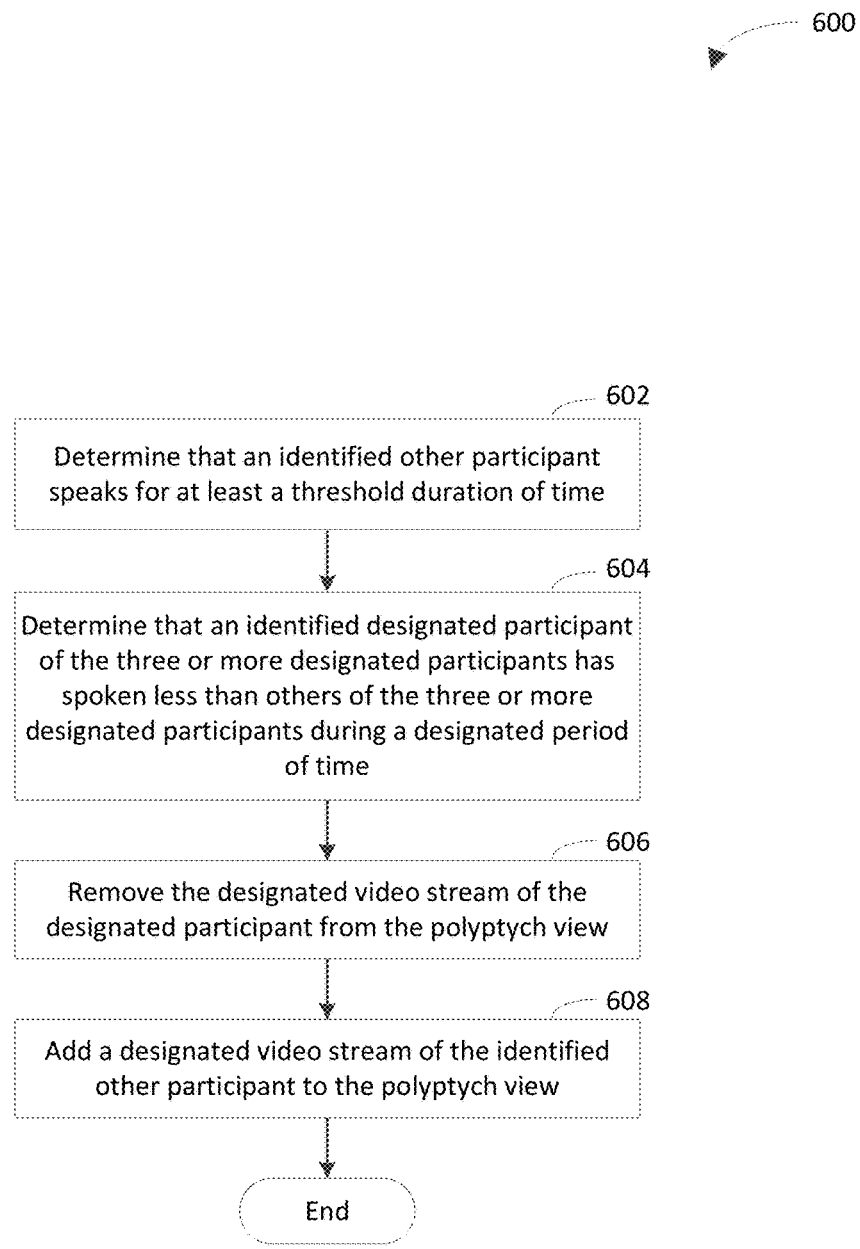

In another example embodiment, the method of flowchart 500 further includes one or more of the steps shown in flowchart 600 of FIG. 6.

As shown in FIG. 6, the method of flowchart 600 begins at step 602. In step 602, a determination is made that an identified other participant (e.g., who is not included in the three or more designated participants) speaks for at least a threshold duration of time. For instance, the determination made be made at step 602 in response to combining the three or more designated video streams to form the polyptych view. In an example implementation, selection logic 1108 determines that the identified other participant speaks for at least the threshold duration of time. For instance, selection logic 1108 may make the determination based on an analysis of the communication 1126.

At step 604, a determination is made that an identified designated participant of the three or more designated participants has spoken less (e.g., a shorter cumulative duration of time and/or fewer words) than others of the three or more designated participants during a designated period of time. For instance, the designated period of time may occur after a time instance at which the polyptych view is formed. In an example implementation, selection logic 1108 determines that the designated participant has spoken less than others of the three or more designated participants during the designated period of time. For instance, selection logic 1108 may make the determination based on an analysis of the communication 1126.

At step 606, the designated video stream of the designated participant is removed from the polyptych view. For instance, the designated video stream of the designated participant may be removed from the polyptych view in response to determining that the identified other participant speaks for at least the threshold duration of time and further in response to determining that the identified designated participant has spoken less than the others of the three or more designated participants during the designated period of time. In an example implementation, removal logic 1114 removes the designated participant from the polyptych view 1144.

At step 608, a designated video stream of the identified other participant is added to the polyptych view. For example, the designated video stream of the identified other participant may be added to the polyptych view in response to determining that the identified other participant speaks for at least the threshold duration of time. In accordance with this example, the designated video stream of the identified other participant may be added to the polyptych view further in response to removing the designated video stream of the identified designated participant from the polyptych view. In an example implementation, addition logic 1116 adds the designated video stream of the identified other participant to the polyptych view 1144.

Figure 7:
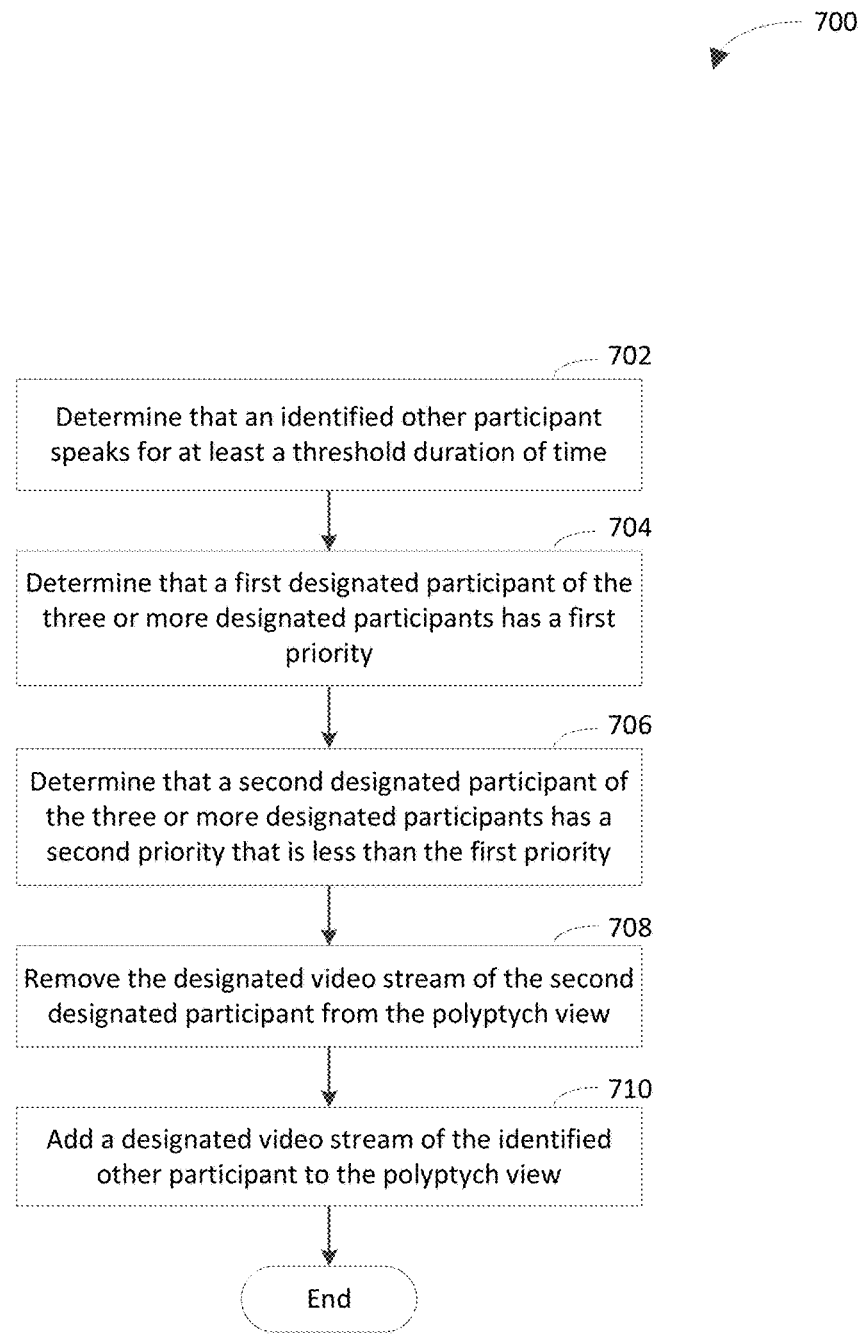

In yet another example embodiment, the method of flowchart 500 further includes one or more of the steps shown in flowchart 700 of FIG. 7.

As shown in FIG. 7, the method of flowchart 700 begins at step 702. In step 702, a determination is made that an identified other participant speaks for at least a threshold duration of time. For instance, the determination may be made at step 702 in response to combining the three or more designated video streams to form the polyptych view. In an example implementation, selection logic 1108 determines that the identified other participant speaks for at least the threshold duration of time.

At step 704, a determination is made that a first designated participant of the three or more designated participants has a first priority. In an example implementation, selection logic 1108 determines that the first designated participant has the first priority. For instance, selection logic 1108 may determine that the first designated participant has the first priority based on the priority information 1128 indicating that the first designated participant has the first priority.

At step 706, a determination is made that a second designated participant of the three or more designated participants has a second priority that is less than the first priority. In an example implementation, selection logic 1108 determines that the second designated participant has the second priority. For instance, selection logic 1108 may determine that the second designated participant has the second priority based on the priority information 1128 indicating that the second designated participant has the second priority. In accordance with this implementation, selection logic 1108 may determine that the second priority is less than the first priority. For instance, selection logic 1108 may determine that the second priority is less than the first priority based on the priority information 1128 indicating that the second priority is less than the first priority.

At step 708, the designated video stream of the second designated participant is removed from the polyptych view. For instance, the designated video stream of the second designated participant may be removed from the polyptych view in response to determining that the identified other participant speaks for at least the threshold duration of time and further in response to the second priority of the second designated participant being less than the first priority of the first designated participant. In an example implementation, removal logic 1114 may remove the designated video stream of the second designated participant from the polyptych view 1144. For instance, removal logic 1114 may remove the designated video stream of the second designated participant from the polyptych view 1144 in response to the designated participant information 1130 indicating that the identified other participant is to be added to the polyptych view 1144 and further indicating that the second priority of the second designated participant is less than the first priority of the first designated participant.

At step 710, a designated video stream of the identified other participant is added to the polyptych view. For example, the designated video stream of the identified other participant may be added to the polyptych view in response to determining that the identified other participant speaks for at least the threshold duration of time. In accordance with this embodiment, the designated video stream of the identified other participant may be added to the polyptych view further in response to removing the designated video stream of the second designated participant from the polyptych view. In an example implementation, addition logic 1116 may add the designated video stream of the identified other participant to the polyptych view 1144. For instance, addition logic 1116 may add the designated video stream of the identified other participant to the polyptych view in response to the designated participant information 1130 indicating that the identified other participant is to be added to the polyptych view 1144.

Figure 8:
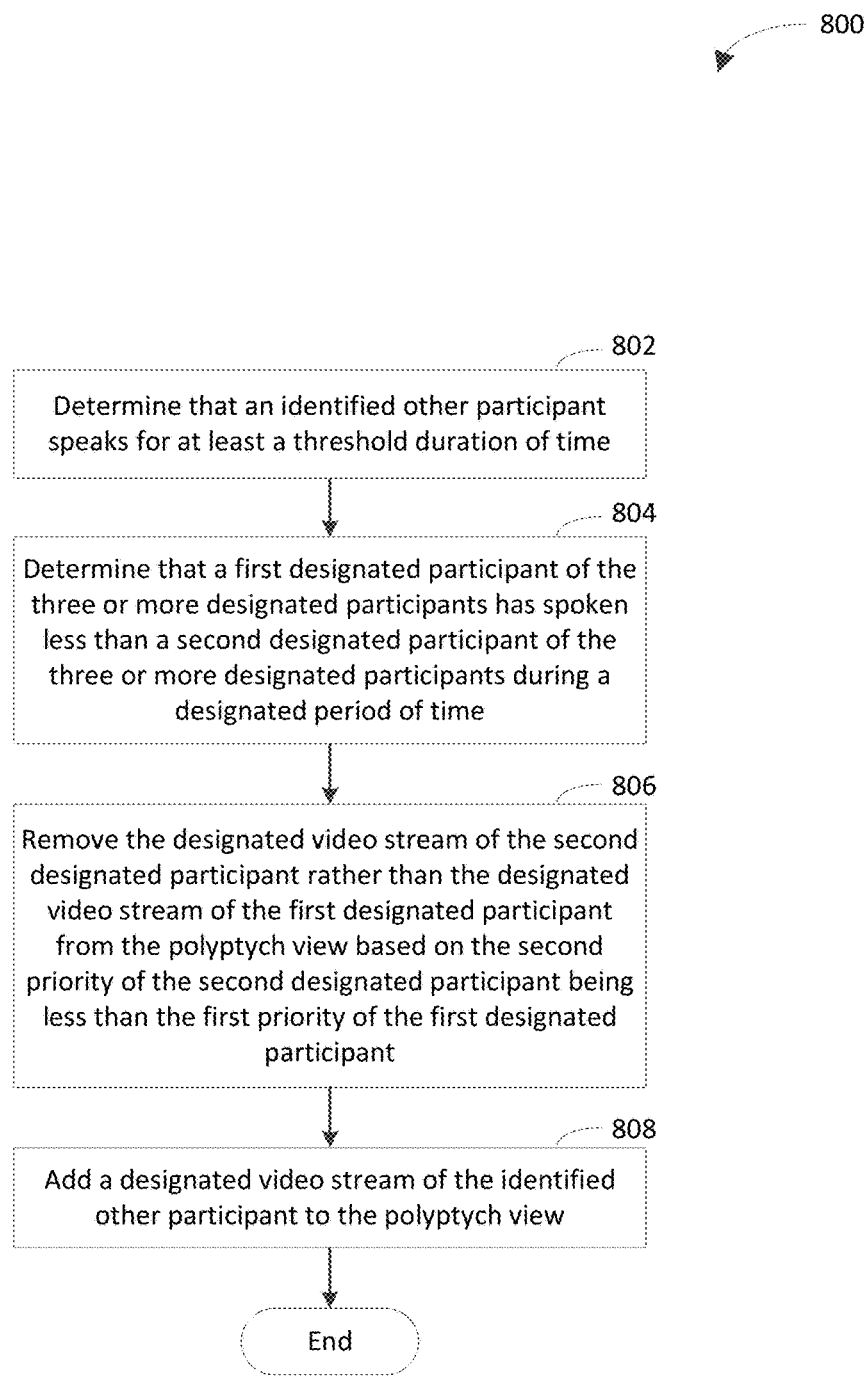

In still another example embodiment, the method of flowchart 500 further includes one or more of the steps shown in flowchart 800 of FIG. 8.

As shown in FIG. 8, the method of flowchart 800 begins at step 802. In step 802, a determination is made that an identified other participant speaks for at least a threshold duration of time. For instance, the determination may be made at step 802 in response to combining the three or more designated video streams to form the polyptych view. In an example implementation, selection logic 1108 may determine that the identified other participant speaks for at least the threshold duration of time.

At step 804, a determination is made that a first designated participant of the three or more designated participants has spoken less than a second designated participant of the three or more designated participants during a designated period of time. For instance, the designated period of time may occur after a time instance at which the polyptych view is formed. The first designated participant has a first priority. The second designated participant has a second priority that is less than the first priority. In an example implementation, selection logic 1108 determines that the first designated participant has spoken less than the second designated participant during the designated period of time. For instance, selection logic 1108 may analyze the communication 1126 to determine that the first designated participant has spoken less than the second designated participant during the designated period of time.

At step 806, the designated video stream of the second designated participant rather than the designated video stream of the first designated participant is removed from the polyptych view based on the second priority of the second designated participant being less than the first priority of the first designated participant. For instance, the designated video stream of the second designated participant may be removed from the polyptych view in response to determining that the identified other participant speaks for at least the threshold duration of time. In an example implementation, removal logic 1114 removes the designated video stream of the second designated participant rather than the designated video stream of the first designated participant from the polyptych view 1144.

At step 808, a designated video stream of the identified other participant is added to the polyptych view. For example, the designated video stream of the identified other participant may be added to the polyptych view in response to determining that the identified other participant speaks for at least the threshold duration of time. In accordance with this example, the designated video stream of the identified other participant may be added to the polyptych view further in response to removing the designated video stream of the second designated participant from the polyptych view. In an example implementation, addition logic 116 adds the designated video stream of the identified other participant to the polyptych view 1144.

Figure 9:
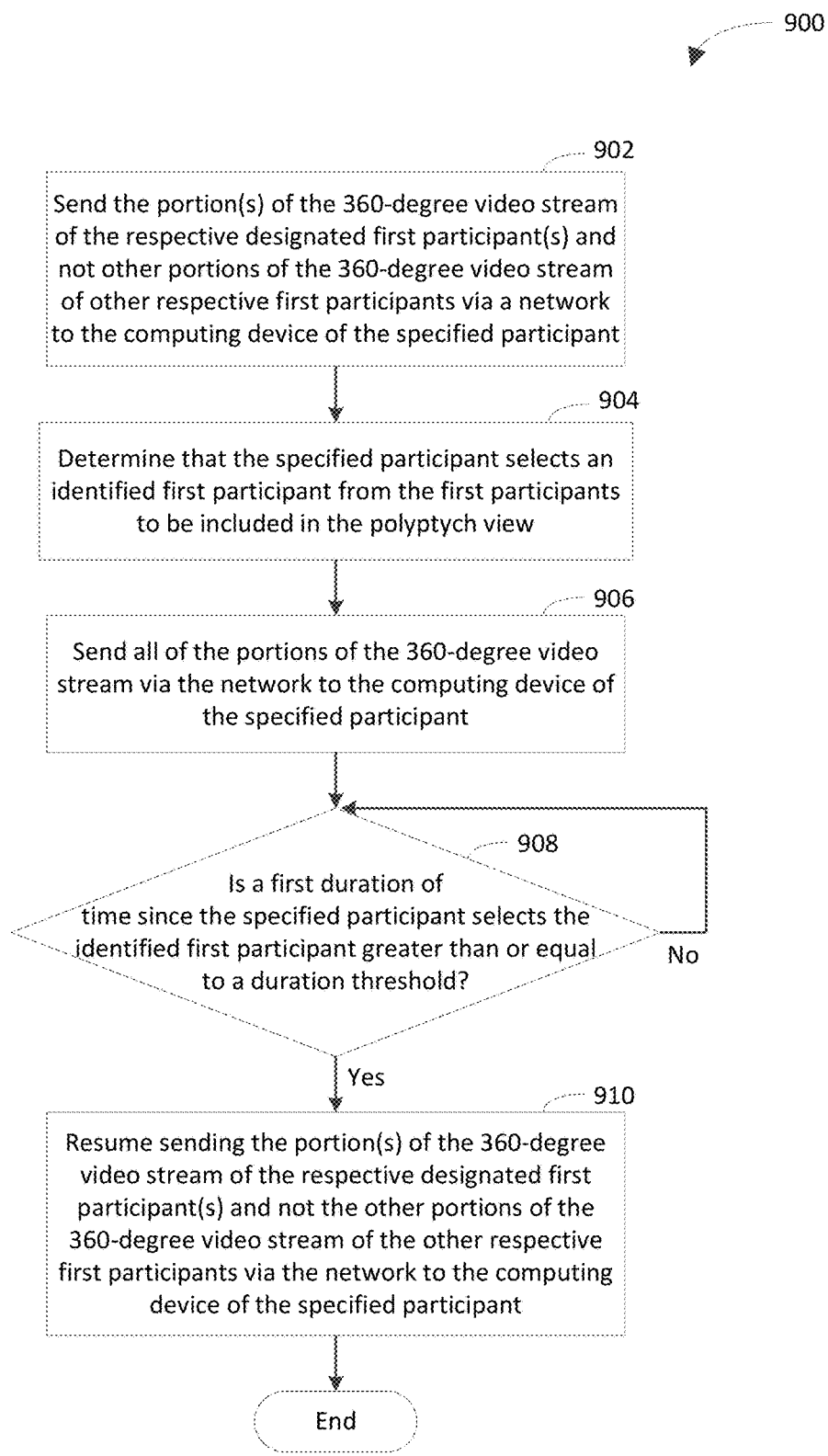

In yet another example embodiment, the method of flowchart 500 further includes one or more of the steps shown in flowchart 900 of FIG. 9.

As shown in FIG. 9, the method of flowchart 900 begins at step 902. In step 902, the portion(s) of the 360-degree video stream of the respective designated first participant(s) and not other portions of the 360-degree video stream of other respective first participants are sent via a network to the computing device of the specified participant. In an example implementation, provision logic 1120 sends the portion(s) of the 360-degree video stream 1132 of the respective designated first participant(s) and not other portions 1148 of the 360-degree video stream 1132 of other respective first participants who are not included in the designated first participant(s) via a network to the computing device of the specified participant.

At step 904, a determination is made that the specified participant selects an identified first participant from the first participants (e.g., who are not included in the three or more designated participants) to be included in the polyptych view. In an example implementation, identification logic 1118 determines that the specified participant selects the identified first participant from the first participants to be included in the polyptych view 1144. In accordance with this implementation, identification logic 1118 may generate identifying information 1140 in response to making the determination. The identifying information may indicate that the video stream of the identified first participant is to be included in the polyptych view 1144. The identifying information 1140 may indicate that the specified participant selects a participant. For instance, the identifying information 1140 may indicate that the specified participant selects the identified first participant.

At step 906, all of the portions of the 360-degree video stream are sent via the network to the computing device of the specified participant. For instance, all of the portions of the 360-degree video stream may be sent via the network to the computing device of the specified participant in response to determining that the specified participant selects the identified first participant. In an example implementation, provision logic 1120 send all of the portions 1136 of the 360-degree video stream 1132 via the network to the computing device of the specified participant. In accordance with this implementation, provision logic 1120 may send all of the portions 1136 based on the identifying information 1140 indicating that the specified participant selects a participant. For instance, provision logic 1120 may send all of the portions 1136 based on the identifying information 1140 indicating that the specified participant selects the identified first participant.

At step 908, a determination is made whether a first duration of time since the specified participant selects the identified first participant is great than or equal to a duration threshold. If the first duration of time is greater than or equal to the duration threshold, flow continues to step 910. Otherwise, flow returns to step 908. In an example implementation, comparison logic 1122 determines whether the first duration of time since the specified participant selects the identified first participant is great than or equal to the duration threshold. For instance, comparison logic 1122 may compare the first duration to the duration threshold to determine whether the first duration is greater than or equal to the duration threshold. In accordance with this implementation, comparison logic 1122 may generate a provision instruction 1142 in response to determining that the first duration of time is greater than or equal to the duration threshold. The provision instruction 1142 may indicate that the portion(s) of the 360-degree video stream 1132 of the respective designated first participant(s) and not the other portions 1148 of the 360-degree video stream 1132 of the other respective first participants who are not included in the designated first participant(s) are to be sent via the network to the computing device of the specified participant.

At step 910, sending the portion(s) of the 360-degree video stream of the respective designated first participant(s) and not the other portions of the 360-degree video stream of the other respective first participants via the network to the computing device of the specified participant is resumed. In an example implementation, provision logic 1120 resumes sending the portion(s) of the 360-degree video stream 1132 of the respective designated first participant(s) and not the other portions 1148 of the 360-degree video stream 1132 of the other respective first participants who are not included in the designated first participant(s) via the network to the computing device of the specified participant. For instance, provision logic 1120 may resume the sending of the portion(s) of the 360-degree video stream 1132 of the respective designated first participant(s) and not the other portions 1148 based on the provision instruction 1142 indicating that the portion(s) of the 360-degree video stream 1132 of the respective designated first participant(s) and not the other portions 1148 are to be sent to the computing device of the specified participant.

In still another example embodiment, the first participants are arranged in a specified order in the field of view. In accordance with this embodiment, the method of flowchart 500 further includes one or more of the steps shown in flowchart 1000 of FIG. 10.

Figure 10:
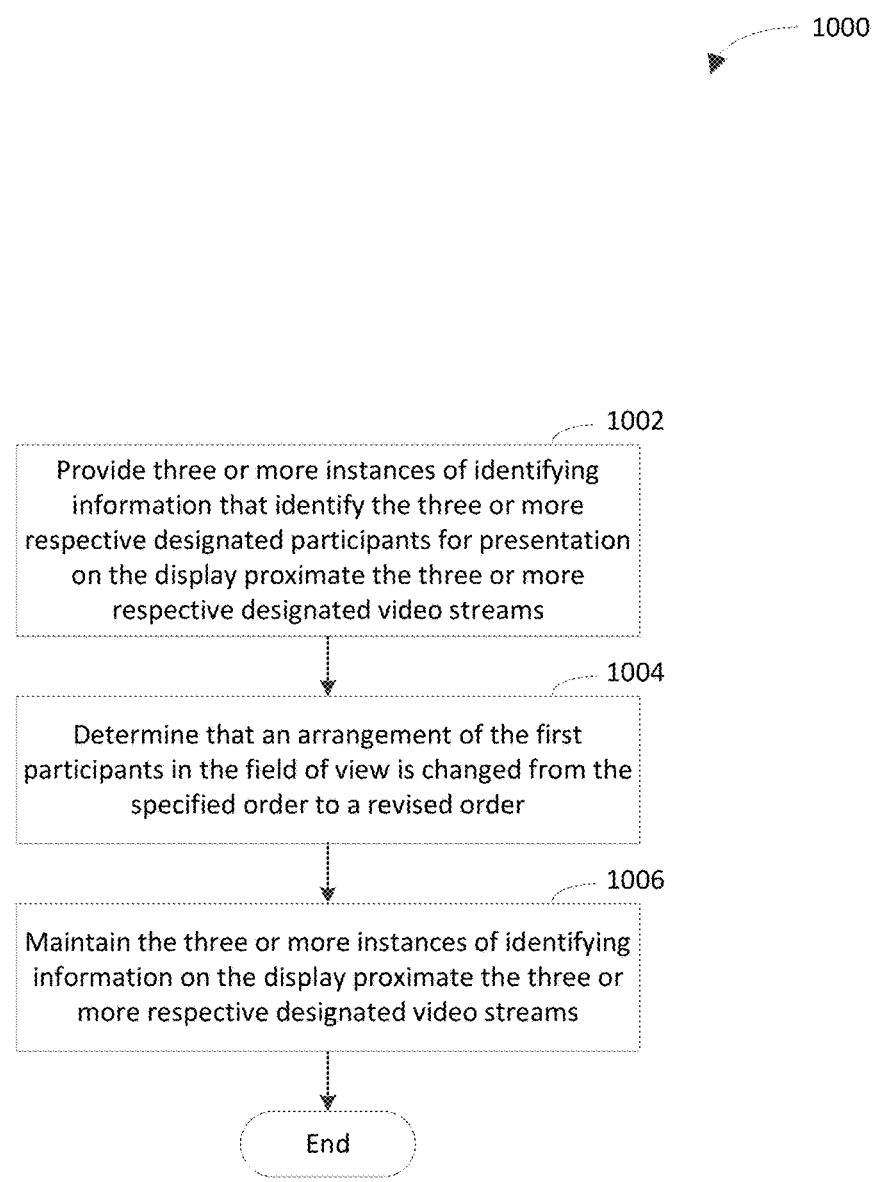
Figure 11:
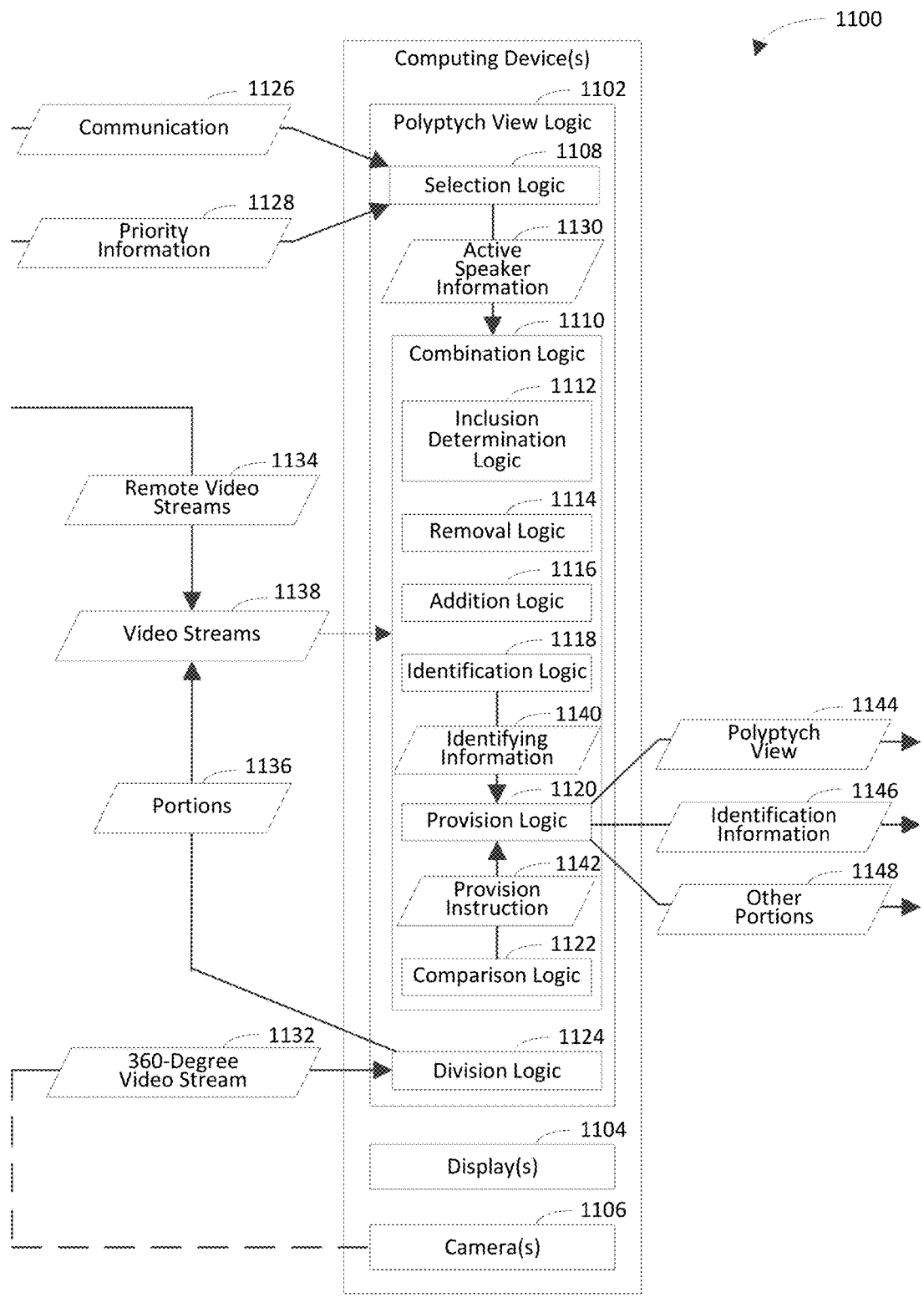
FIG. 11 is a block diagram of an example computing system in accordance with an embodiment.

As shown in FIG. 10, the method of flowchart 1000 begins at step 1002. In step 1002, three or more instances of identifying information that identify the three or more respective designated participants are provided for presentation on the display proximate the three or more respective designated video streams. For instance, the three or more instances of identifying information may be overlaid on the three or more respective designated video streams. In an example implementation, provision logic provides three or more instances of identifying information 1146 that identify the three or more respective designated participants for presentation on the display (e.g., one or more of display(s) 1104) proximate the three or more respective designated video streams.

At step 1004, a determination is made that an arrangement of the first participants in the field of view is changed from the specified order to a revised order. In an example implementation, identification logic 1140 determines that the arrangement of the first participants in the field of view is changed from the specified order to the revised order. In accordance with this implementation, identification logic 1140 may generate the identifying information 1140 in response to making the determination. For instance, the identifying information 1140 may indicate the revised order.

At step 1006, the three or more instances of identifying information are maintained on the display proximate the three or more respective designated video streams. For example, the three or more instances of identifying information may be maintained on the display proximate the three or more respective designated video streams in response to determining that the arrangement of the first participants in the field of view is changed from the specified order to the revised order. In another example, the three or more instances of identifying information may be maintained even though an order of at least one of the one or more designated first participants with respect to one or more of the other first participants changes. In an example implementation, provision logic 1120 maintains the three or more instances of the identifying information 1146 on the display proximate the three or more respective designated video streams.

It will be recognized that computing device(s) 1100 may not include one or more of polyptych view logic 1102, display(s) 1104, camera(s) 1106, selection logic 1108, combination logic 1110, inclusion determination logic 1112, removal logic 1114, addition logic 1116, identification logic 1118, provision logic 1120, comparison logic 1122, and/or division logic 1124. Furthermore, computing device(s) 1100 may include components in addition to or in lieu of polyptych view logic 1102, display(s) 1104, camera(s) 1106, selection logic 1108, combination logic 1110, inclusion determination logic 1112, removal logic 1114, addition logic 1116, identification logic 1118, provision logic 1120, comparison logic 1122, and/or division logic 1124.

Any one or more of remote polyptych view logic 128A-128N, local polyptych view logic 118, polyptych view logic 1102, display(s) 1104, camera(s) 1106, selection logic 1108, combination logic 1110, inclusion determination logic 1112, removal logic 1114, addition logic 1116, identification logic 1118, provision logic 1120, comparison logic 1122, division logic 1124, flowchart 500, flowchart 600, flowchart 700, flowchart 800, flowchart 900, and/or flowchart 1000 may be implemented in hardware, software, firmware, or any combination thereof.

For example, any one or more of remote polyptych view logic 128A-128N, local polyptych view logic 118, polyptych view logic 1102, display(s) 1104, camera(s) 1106, selection logic 1108, combination logic 1110, inclusion determination logic 1112, removal logic 1114, addition logic 1116, identification logic 1118, provision logic 1120, comparison logic 1122, division logic 1124, flowchart 500, flowchart 600, flowchart 700, flowchart 800, flowchart 900, and/or flowchart 1000 may be implemented, at least in part, as computer program code configured to be executed in one or more processors.

In another example, any one or more of remote polyptych view logic 128A-128N, local polyptych view logic 118, polyptych view logic 1102, display(s) 1104, camera(s) 1106, selection logic 1108, combination logic 1110, inclusion determination logic 1112, removal logic 1114, addition logic 1116, identification logic 1118, provision logic 1120, comparison logic 1122, division logic 1124, flowchart 500, flowchart 600, flowchart 700, flowchart 800, flowchart 900, and/or flowchart 1000 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In an example method of providing a polyptych view that includes three or more designated video streams, three or more designated participants are selected from participants of a video conference based on, for each participant, at least one of a priority of the respective participant or a speaker metric of the respective participant. The participants include a plurality of first participants and one or more second participants. The plurality of first participants are in a field of view of a 360-degree camera that is configured to provide a 360-degree video stream that includes a plurality of portions that correspond to the plurality of respective first participants based on the field of view. The one or more second participants are not in the field of view of the 360-degree camera. The three or more designated participants include one or more designated first participants of the plurality of first participants. The three or more designated video streams of the three or more respective designated participants are combined to form the polyptych view for presentation on a display of a computing device of a specified participant that is included in the one or more second participants. The three or more designated video streams include one or more first video streams of the one or more respective designated first participants. The one or more first video streams are one or more respective portions of the plurality of portions of the 360-degree video stream.

In a first aspect of the example method, the one or more second participants include a plurality of second participants. In accordance with the first aspect, the three or more designated participants further include at least one designated second participant of the plurality of second participants. In further accordance with the first aspect, the at least one designated second participant does not include the specified participant.

In a second aspect of the example method, each portion of the plurality of portions of the 360-degree video stream is configured to be a video headshot of the first participant to which the respective portion corresponds. The second aspect of the example method may be implemented in combination with the first aspect of the example method, though the example embodiments are not limited in this respect.

In a third aspect of the example method, the example method further comprises dividing the 360-degree video stream into the plurality of portions based on the plurality of respective first participants. In accordance with the third aspect, the example method further comprises determining whether each portion of the plurality of portions is to be included in the polyptych view based on whether the three or more designated participants include the first participant to which the respective portion corresponds. The third aspect of the example method may be implemented in combination with the first and/or second aspect of the example method, though the example embodiments are not limited in this respect.

In a fourth aspect of the example method, the one or more second participants include a plurality of second participants. In accordance with the fourth aspect, the three or more designated participants further include at least two specified second participants of the plurality of second participants. In further accordance with the fourth aspect, the at least two specified second participants do not include the specified participant. The fourth aspect of the example method may be implemented in combination with the first, second, and/or third aspect of the example method, though the example embodiments are not limited in this respect.

In a fifth aspect of the example method, the example method further comprises monitoring the communication among the participants. In accordance with the fifth aspect, selecting the three or more designated participants comprises selecting the three or more designated participants from the participants based on an analysis of the communication indicating that each of the three or more designated participants speaks for at least a threshold duration of time. The fifth aspect of the example method may be implemented in combination with the first, second, third, and/or fourth aspect of the example method, though the example embodiments are not limited in this respect.

In a sixth aspect of the example method, three or more designated participants include at least two designated first participants of the plurality of first participants. In accordance with the sixth aspect, the three or more designated video streams include at least two first video streams of the at least two respective designated first participants. In further accordance with the sixth aspect, the at least two first video streams are at least two respective portions of the plurality of portions of the 360-degree video stream. The sixth aspect of the example method may be implemented in combination with the first, second, third, fourth, and/or fifth aspect of the example method, though the example embodiments are not limited in this respect.

In a seventh aspect of the example method, the example method further comprises capturing an image that is defined by the field of view and that shows the plurality of first participants. In accordance with the seventh aspect, the example method further comprises providing the 360-degree video stream to include the plurality of portions based on the image showing the plurality of respective first participants. The seventh aspect of the example method may be implemented in combination with the first, second, third, fourth, fifth, and/or sixth aspect of the example method, though the example embodiments are not limited in this respect.

In an eighth aspect of the example method, the example method further comprises determining that an identified designated participant of the three or more designated participants does not speak for at least a threshold duration of time. In accordance with the eighth aspect, the example method further comprises removing the designated video stream of the identified designated participant from the polyptych view in response to determining that the identified designated participant does not speak for at least the threshold duration of time. The eighth aspect of the example method may be implemented in combination with the first, second, third, fourth, fifth, sixth, and/or seventh aspect of the example method, though the example embodiments are not limited in this respect.

In a ninth aspect of the example method, the example method further comprises determining that an identified other participant from the participants speaks for at least a threshold duration of time in response to combining the three or more designated video streams to form the polyptych view. In accordance with the ninth aspect, the example method further comprises determining that an identified designated participant of the three or more designated participants has spoken less than others of the three or more designated participants during a designated period of time. In further taccordance with the ninth aspect, the example method further comprises removing the designated video stream of the identified designated participant from the polyptych view in response to determining that the identified other participant speaks for at least the threshold duration of time and further in response to determining that the identified designated participant has spoken less than the others of the three or more designated participants during the designated period of time. In further accordance with the ninth aspect, the example method further comprises adding a designated video stream of the identified other participant to the polyptych view in response to determining that the identified other participant speaks for at least the threshold duration of time. The ninth aspect of the example method may be implemented in combination with the first, second, third, fourth, fifth, sixth, seventh, and/or eighth aspect of the example method, though the example embodiments are not limited in this respect.

In a tenth aspect of the example method, selecting the three or more designated participants comprises selecting a first designated participant who has a first priority from the participants based on the first designated participant speaking for at least a first threshold duration of time that is associated with the first priority. In accordance with the tenth aspect, selecting the three or more designated participants further comprises selecting a second designated participant who has a second priority from the participants based on the second designated participant speaking for at least a second threshold duration of time that is associated with the second priority. In further accordance with the tenth aspect, the second priority is greater than the first priority. In further accordance with the tenth aspect, the second threshold duration of time is less than the first threshold duration of time. The tenth aspect of the example method may be implemented in combination with the first, second, third, fourth, fifth, sixth, seventh, eighth, and/or ninth aspect of the example method, though the example embodiments are not limited in this respect.

In an eleventh aspect of the example method, the example method further comprises determining that an identified other participant from the participants speaks for at least a threshold duration of time in response to combining the three or more designated video streams to form the polyptych view. In accordance with the eleventh aspect, the example method further comprises determining that a first designated participant of the three or more designated participants has a first priority. In further accordance with the eleventh aspect, the example method further comprises determining that a second designated participant of the three or more designated participants has a second priority that is less than the first priority. In further accordance with the eleventh aspect, the example method further comprises removing the designated video stream of the second designated participant from the polyptych view in response to determining that the identified other participant speaks for at least the threshold duration of time and further in response to the second priority of the second designated participant being less than the first priority of the first designated participant. In further accordance with the eleventh aspect, the example method further comprises adding a designated video stream of the identified other participant to the polyptych view in response to determining that the identified other participant speaks for at least the threshold duration of time. The eleventh aspect of the example method may be implemented in combination with the first, second, third, fourth, fifth, sixth, seventh, eighth, ninth, and/or tenth aspect of the example method, though the example embodiments are not limited in this respect.

In a twelfth aspect of the example method, the example method further comprises determining that an identified other participant from the participants speaks for at least a threshold duration of time in response to combining the three or more designated video streams to form the polyptych view. In accordance with the twelfth aspect, the example method further comprises determining that a first designated participant of the three or more designated participants has spoken less than a second designated participant of the three or more designated participants during a designated period of time. The first designated participant has a first priority. The second designated participant has a second priority that is less than the first priority. In further accordance with the twelfth aspect, the example method further comprises removing the designated video stream of the second designated participant rather than the designated video stream of the first designated participant from the polyptych view in response to determining that the identified other participant speaks for at least the threshold duration of time based on the second priority of the second designated participant being less than the first priority of the first designated participant. In further accordance with the twelfth aspect, the example method further comprises adding a designated video stream of the identified other participant to the polyptych view in response to determining that the identified other participant speaks for at least the threshold duration of time. The twelfth aspect of the example method may be implemented in combination with the first, second, third, fourth, fifth, sixth, seventh, eighth, ninth, tenth, and/or eleventh aspect of the example method, though the example embodiments are not limited in this respect.

In a thirteenth aspect of the example method, the example method further comprises sending the one or more portions of the 360-degree video stream of the one or more respective designated first participants and not other portions of the 360-degree video stream of other respective first participants via a network to the computing device of the specified participant. In accordance with the thirteenth aspect, the example method further comprises determining that the specified participant selects an identified first participant from the plurality of first participants to be included in the polyptych view. In further accordance with the thirteenth aspect, the example method further comprises sending all of the plurality of portions of the 360-degree video stream via the network to the computing device of the specified participant in response to determining that the specified participant selects the identified first participant. The thirteenth aspect of the example method may be implemented in combination with the first, second, third, fourth, fifth, sixth, seventh, eighth, ninth, tenth, eleventh, and/or twelfth aspect of the example method, though the example embodiments are not limited in this respect.

In an example of the thirteenth aspect of the example method, the example method further comprises comparing a first duration of time since the specified participant selects the identified first participant to a duration threshold. In accordance with this example of the thirteenth aspect, the example method further comprises resuming sending the one or more portions of the 360-degree video stream of the one or more respective designated first participants and not the other portions of the 360-degree video stream of the other respective first participants via the network to the computing device of the specified participant in response to the first duration of time being greater than or equal to the duration threshold.

In a fourteenth aspect of the example method, the plurality of first participants are arranged in a specified order in the field of view. In accordance with the fifteenth aspect, the example method further comprises providing three or more instances of identifying information that identify the three or more respective designated participants for presentation on the display proximate the three or more respective designated video streams. In further accordance with the fifteenth aspect, the example method further comprises determining that an arrangement of the plurality of first participants in the field of view is changed from the specified order to a revised order. In further accordance with the fifteenth aspect, the example method further comprises maintaining the three or more instances of identifying information on the display proximate the three or more respective designated video streams in response to determining that the arrangement of the plurality of first participants in the field of view is changed from the specified order to the revised order. The fourteenth aspect of the example method may be implemented in combination with the first, second, third, fourth, fifth, sixth, seventh, eighth, ninth, tenth, eleventh, twelfth, and/or thirteenth aspect of the example method, though the example embodiments are not limited in this respect.

An example system to provide a polyptych view that includes three or more designated video streams comprises selection logic configured to select three or more designated participants from participants of a video conference based on, for each participant, at least one of a priority of the respective participant or a speaker metric of the respective participant. The participants include a plurality of first participants and one or more second participants. The plurality of first participants are in a field of view of a 360-degree camera that is configured to provide a 360-degree video stream that includes a plurality of portions that correspond to the plurality of respective first participants based on the field of view. The one or more second participants are not in the field of view of the 360-degree camera. The three or more designated participants include one or more designated first participants of the plurality of first participants. The example system further comprises combination logic configured to combine the three or more designated video streams of the three or more respective designated participants to form the polyptych view for presentation on a display of a computing device of a specified participant that is included in the one or more second participants. The three or more designated video streams include one or more first video streams of the one or more respective designated first participants. The one or more first video streams are one or more respective portions of the plurality of portions of the 360-degree video stream.

In a first aspect of the example system, the one or more second participants include a plurality of second participants. In accordance with the first aspect, the three or more designated participants further include at least one designated second participant of the plurality of second participants. In further accordance with the first aspect, the at least one designated second participant does not include the specified participant.

In a second aspect of the example system, each portion of the plurality of portions of the 360-degree video stream is configured to be a video headshot of the first participant to which the respective portion corresponds. The second aspect of the example system may be implemented in combination with the first aspect of the example system, though the example embodiments are not limited in this respect.

In a third aspect of the example system, the example system further comprises division logic configured to divide the 360-degree video stream into the plurality of portions based on the plurality of respective first participants. In accordance with the third aspect, the combination logic comprises inclusion determination logic configured to determine whether each portion of the plurality of portions is to be included in the polyptych view based on whether the three or more designated participants include the first participant to which the respective portion corresponds. The third aspect of the example system may be implemented in combination with the first and/or second aspect of the example system, though the example embodiments are not limited in this respect.

In a fourth aspect of the example system, the one or more second participants includes a plurality of second participants. In accordance with the fourth aspect, the three or more designated participants further include at least two designated second participants of the plurality of second participants. In accordance with the fourth aspect, the at least two designated second participants do not include the specified participant. The fourth aspect of the example system may be implemented in combination with the first, second, and/or third aspect of the example system, though the example embodiments are not limited in this respect.

In a fifth aspect of the example system, the selection logic is further configured to monitor communication among the participants. In accordance with the fifth aspect, the selection logic is configured to select the three or more designated participants from the participants based on an analysis of the communication indicating that each of the three or more designated participants speaks for at least a threshold duration of time. The fifth aspect of the example system may be implemented in combination with the first, second, third, and/or fourth aspect of the example system, though the example embodiments are not limited in this respect.

In a sixth aspect of the example system, the three or more designated participants include at least two designated first participants of the plurality of first participants. In accordance with the sixth aspect, the three or more designated video streams include at least two first video streams of the at least two respective designated first participants. In further accordance with the sixth aspect, the at least two first video streams are at least two respective portions of the plurality of portions of the 360-degree video stream. The sixth aspect of the example system may be implemented in combination with the first, second, third, fourth, and/or fifth aspect of the example system, though the example embodiments are not limited in this respect.

In a seventh aspect of the example system, the selection logic is further configured to determine whether an identified designated participant of the three or more designated participants does not speak for at least a threshold duration of time. In accordance with the seventh aspect, the combination logic comprises removal logic configured to remove the designated video stream of the identified designated participant from the polyptych view in response to a determination that the identified designated participant does not speak for at least the threshold duration of time. The seventh aspect of the example system may be implemented in combination with the first, second, third, fourth, fifth, and/or sixth aspect of the example system, though the example embodiments are not limited in this respect.

In an eighth aspect of the example system, the selection logic is further configured to determine whether an identified other participant from the participants speaks for at least a threshold duration of time in response to the three or more designated video streams being combined to form the polyptych view. In accordance with the eighth aspect, the selection logic is further configured to determine whether an identified designated participant of the three or more designated participants has spoken less than others of the three or more designated participants during a designated period of time. In further accordance with the eighth aspect, the combination logic comprises removal logic configured to remove the designated video stream of the identified designated participant from the polyptych view in response to a determination that the identified other participant speaks for at least the threshold duration of time and further in response to a determination that the identified designated participant has spoken less than the others of the three or more designated participants during the designated period of time. In further accordance with the eighth aspect, the combination logic further comprises addition logic configured to add a designated video stream of the identified other participant to the polyptych view in response to the determination that the identified other participant speaks for at least the threshold duration of time. The eighth aspect of the example system may be implemented in combination with the first, second, third, fourth, fifth, sixth, and/or seventh aspect of the example system, though the example embodiments are not limited in this respect.

In a ninth aspect of the example system, the selection logic is configured to select a first designated participant who has a first priority from the participants based on the first designated participant speaking for at least a first threshold duration of time that is associated with the first priority. In accordance with the ninth aspect, the selection logic is configured to select a second designated participant who has a second priority from the participants based on the second designated participant speaking for at least a second threshold duration of time that is associated with the second priority. In further accordance with the ninth aspect, the second priority is greater than the first priority. In further accordance with the ninth aspect, the second threshold duration of time is less than the first threshold duration of time. The ninth aspect of the example system may be implemented in combination with the first, second, third, fourth, fifth, sixth, seventh, and/or eighth aspect of the example system, though the example embodiments are not limited in this respect.

In a tenth aspect of the example system, the selection logic is further configured to determine whether an identified other participant from the participants speaks for at least a threshold duration of time in response to the three or more designated video streams being combined to form the polyptych view. In accordance with the tenth aspect, the selection logic is configured to determine that a first designated participant of the three or more designated participants has a first priority. In further accordance with the tenth aspect, the selection logic is configured to determine that a second designated participant of the three or more designated participants has a second priority that is less than the first priority. In further accordance with the tenth aspect, the combination logic comprises removal logic configured to remove the designated video stream of the second designated participant from the polyptych view in response to a determination that the identified other participant speaks for at least the threshold duration of time and further in response to the second priority of the second designated participant being less than the first priority of the first designated participant. In further accordance with the tenth aspect, the combination logic comprises addition logic configured to add a designated video stream of the identified other participant to the polyptych view in response to the determination that the identified other participant speaks for at least the threshold duration of time. The tenth aspect of the example system may be implemented in combination with the first, second, third, fourth, fifth, sixth, seventh, eighth, and/or ninth aspect of the example system, though the example embodiments are not limited in this respect.

In a eleventh aspect of the example system, the selection logic is further configured to determine whether an identified other participant from the participants speaks for at least a threshold duration of time in response to the three or more designated video streams being combined to form the polyptych view. In accordance with the eleventh aspect, the selection logic is further configured to determine whether a first designated participant of the three or more designated participants has spoken less than a second designated participant of the three or more designated participants during a designated period of time. The first designated participant has a first priority. The second designated participant has a second priority that is less than the first priority. In further accordance with the eleventh aspect, the combination logic comprises removal logic configured to remove the designated video stream of the second designated participant rather than the designated video stream of the first designated participant from the polyptych view in response to a determination that the identified other participant speaks for at least the threshold duration of time based on the second priority of the second designated participant being less than the first priority of the first designated participant. In further accordance with the eleventh aspect, the combination logic further comprises addition logic configured to add a designated video stream of the identified other participant to the polyptych view in response to the determination that the identified other participant speaks for at least the threshold duration of time. The eleventh aspect of the example system may be implemented in combination with the first, second, third, fourth, fifth, sixth, seventh, eighth, ninth, and/or tenth aspect of the example system, though the example embodiments are not limited in this respect.

In a twelfth aspect of the example system, the combination logic comprises provision logic configured to send the one or more portions of the 360-degree video stream of the one or more respective designated first participants and not other portions of the 360-degree video stream of other respective first participants via a network to the computing device of the specified participant. In accordance with the twelfth aspect, the combination logic further comprises identification logic configured to determine that the specified participant selects an identified first participant from the plurality of first participants to be included in the polyptych view. In further accordance with the twelfth aspect, the provision logic is further configured to send all of the plurality of portions of the 360-degree video stream via the network to the computing device of the specified participant in response to a determination that the specified participant selects the identified first participant. The twelfth aspect of the example system may be implemented in combination with the first, second, third, fourth, fifth, sixth, seventh, eighth, ninth, tenth, and/or eleventh aspect of the example system, though the example embodiments are not limited in this respect.

In an example of the twelfth aspect of the example system, the combination logic comprises comparison logic configured to compare a first duration of time since the specified participant selects the identified first participant to a duration threshold. In accordance with this example of the twelfth aspect, the provision logic is further configured to resume sending the one or more portions of the 360-degree video stream of the one or more respective designated first participants and not the other portions of the 360-degree video stream of the other respective first participants via the network to the computing device of the specified participant in response to the first duration of time being greater than or equal to the duration threshold.

In a thirteenth aspect of the example system, the plurality of first participants are arranged in a specified order in the field of view. In accordance with the thirteenth aspect, the combination logic comprises provision logic configured to provide three or more instances of identifying information that identify the three or more respective designated participants for presentation on the display proximate the three or more respective designated video streams. In further accordance with the thirteenth aspect, the example system further comprises identification logic configured to determine whether an arrangement of the plurality of first participants in the field of view is changed from the specified order to a revised order. In further accordance with the thirteenth aspect, the provision logic is configured to maintain the three or more instances of identifying information on the display proximate the three or more respective designated video streams in response to a determination that the arrangement of the plurality of first participants in the field of view is changed from the specified order to the revised order. The thirteenth aspect of the example system may be implemented in combination with the first, second, third, fourth, fifth, sixth, seventh, eighth, ninth, tenth, eleventh, and/or twelfth aspect of the example system, though the example embodiments are not limited in this respect.

An example computer program product comprises a computer-readable storage medium having computer program logic recorded thereon for enabling a processor-based system to provide a polyptych view that includes three or more designated video streams. The computer program logic comprises first program logic for enabling the processor-based system to select three or more designated participants from participants of a video conference based on, for each participant, at least one of a priority of the respective participant or a speaker metric of the respective participant. The participants include a plurality of first participants and one or more second participants. The plurality of first participants are in a field of view of a 360-degree camera that is configured to provide a 360-degree video stream that includes a plurality of portions that correspond to the plurality of respective first participants based on the field of view. The one or more second participants are not in the field of view of the 360-degree camera. The three or more designated participants include one or more designated first participants of the plurality of first participants. The computer program logic further comprises second program logic for enabling the processor-based system to combine the three or more designated video streams of the three or more respective designated participants to form the polyptych view for presentation on a display of a computing device of a specified participant that is included in the one or more second participants. The three or more designated video streams include one or more first video streams of the one or more respective designated first participants. The one or more first video streams are one or more respective portions of the plurality of portions of the 360-degree video stream.

IV. Example Computer System

Figure 12:
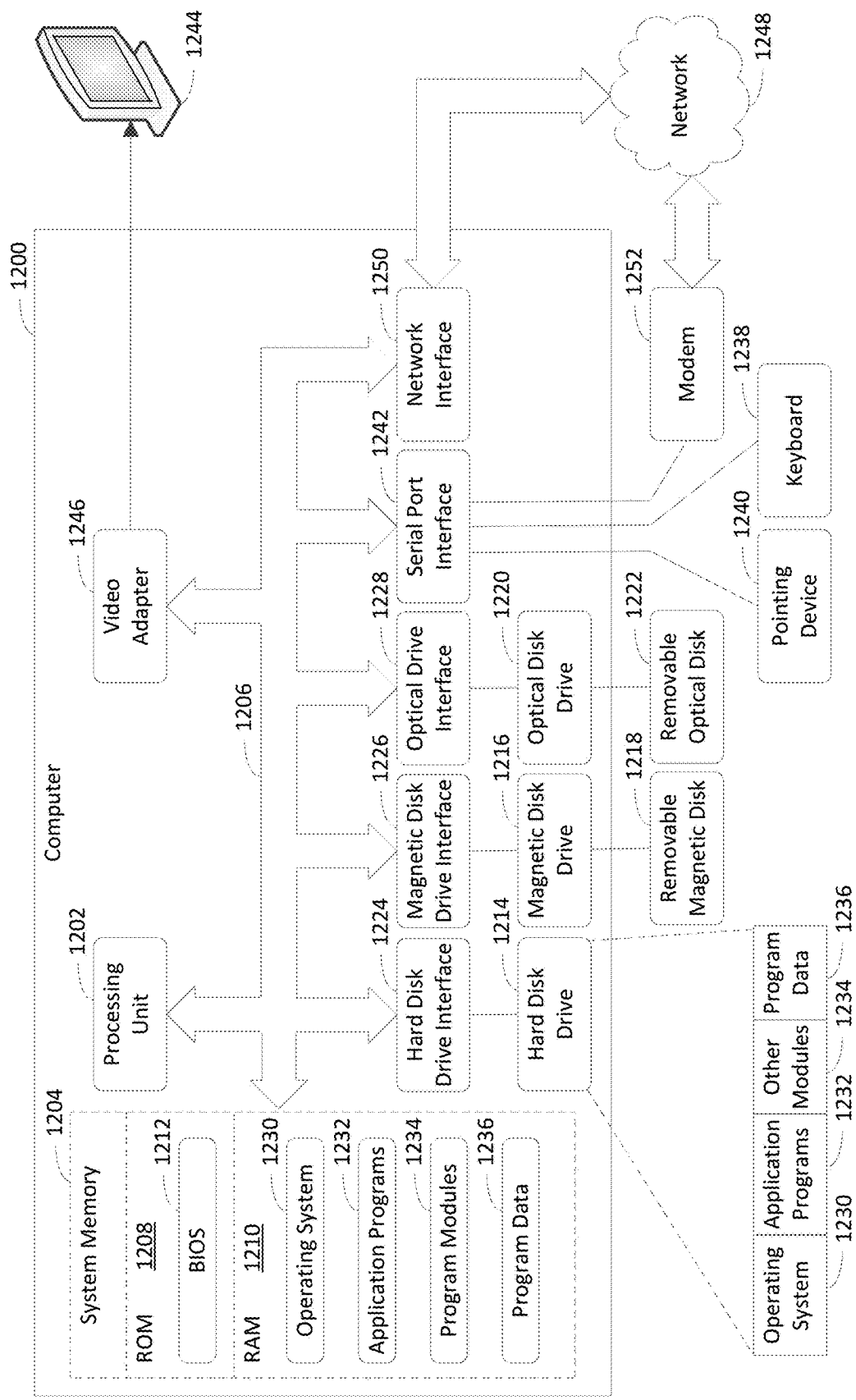
FIG. 12 depicts an example computer in which embodiments may be implemented.

FIG. 12 depicts an example computer 1200 in which embodiments may be implemented. Any one or more of computing devices 106A-106N and/or video conference device 102 shown in FIG. 1; computing device 200 shown in FIG. 2; computing device 300 shown in FIG. 3; computing device 400 shown in FIG. 4; and/or any one or more of computing device(s) 1100 shown in FIG. 11 may be implemented using computer 1200, including one or more features of computer 1200 and/or alternative features. Computer 1200 may be a general-purpose computing device in the form of a conventional personal computer, a mobile computer, or a workstation, for example, or computer 1200 may be a special purpose computing device. The description of computer 1200 provided herein is provided for purposes of illustration, and is not intended to be limiting. Embodiments may be implemented in further types of computer systems, as would be known to persons skilled in the relevant art(s).

As shown in FIG. 12, computer 1200 includes a processing unit 1202, a system memory 1204, and a bus 1206 that couples various system components including system memory 1204 to processing unit 1202. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computer 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1230, one or more application programs 1232, other program modules 1234, and program data 1236. Application programs 1232 or program modules 1234 may include, for example, computer program logic for implementing any one or more of remote polyptych view logic 128A-128N, local polyptych view logic 118, polyptych view logic 1102, selection logic 1108, combination logic 1110, inclusion determination logic 1112, removal logic 1114, addition logic 1116, identification logic 1118, provision logic 1120, comparison logic 1122, division logic 1124, flowchart 500 (including any step of flowchart 500), flowchart 600 (including any step of flowchart 600), flowchart 700 (including any step of flowchart 700), flowchart 800 (including any step of flowchart 800), flowchart 900 (including any step of flowchart 900), and/or flowchart 1000 (including any step of flowchart 1000), as described herein.

A user may enter commands and information into the computer 1200 through input devices such as keyboard 1238 and pointing device 1240. Other input devices (not shown) may include a microphone, joystick, game pad, satellite dish, scanner, touch screen, camera, accelerometer, gyroscope, or the like. These and other input devices are often connected to the processing unit 1202 through a serial port interface 1242 that is coupled to bus 1206, but may be connected by other interfaces, such as a parallel port, game port, or a universal serial bus (USB).

A display device 1244 (e.g., a monitor) is also connected to bus 1206 via an interface, such as a video adapter 1246. In addition to display device 1244, computer 1200 may include other peripheral output devices (not shown) such as speakers and printers.

Computer 1200 is connected to a network 1248 (e.g., the Internet) through a network interface or adapter 1250, a modem 1252, or other means for establishing communications over the network. Modem 1252, which may be internal or external, is connected to bus 1206 via serial port interface 1242.

As used herein, the terms "computer program medium" and "computer-readable storage medium" are used to generally refer to media (e.g., non-transitory media) such as the hard disk associated with hard disk drive 1214, removable magnetic disk 1218, removable optical disk 1222, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250 or serial port interface 1242. Such computer programs, when executed or loaded by an application, enable computer 1200 to implement features of embodiments discussed herein. Accordingly, such computer programs represent controllers of the computer 1200.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A method of providing a polyptych view that includes three or more designated video streams, the method comprising:
    selecting three or more designated participants from participants of a video conference based on at least one of a priority of each participant or a speaker metric of each participant, the participants including a plurality of first participants and one or more second participants, the plurality of first participants are in a field of view of a 360-degree camera that is configured to provide a 360-degree video stream that includes a plurality of portions that correspond to the plurality of respective first participants based on the field of view, the one or more second participants are not in the field of view of the 360-degree camera, the three or more designated participants including one or more designated first participants of the plurality of first participants;
    dividing the 360-degree video stream into the plurality of portions based on the plurality of respective first participants;
    determining whether each portion of the plurality of portions is to be included in the polyptych view based on whether the three or more designated participants include the first participant to which the respective portion corresponds; and
    combining the three or more designated video streams of the three or more respective designated participants to form the polyptych view for presentation on a display of a computing device of a specified participant that is included in the one or more second participants, the three or more designated video streams comprising one or more first video streams of the one or more respective designated first participants, the one or more first video streams being one or more respective portions of the plurality of portions of the 360-degree video stream.

2. The method of claim 1, wherein the one or more second participants include a plurality of second participants;
    wherein the three or more designated participants further include at least one designated second participant of the plurality of second participants; and
    wherein the at least one designated second participant does not include the specified participant.

3. The method of claim 1, further comprising:
    determining that an identified designated participant of the three or more designated participants does not speak for at least a threshold duration of time; and
    removing the designated video stream of the identified designated participant from the polyptych view in response to the determination.

4. The method of claim 1, further comprising:
    determining that an identified other participant from the participants speaks for at least a threshold duration of time in response to combining the three or more designated video streams to form the polyptych view;
    determining that an identified designated participant of the three or more designated participants has spoken less than others of the three or more designated participants during a designated period of time;
    removing the designated video stream of the identified designated participant from the polyptych view in response to determining that the identified other participant speaks for at least the threshold duration of time and further in response to determining that the identified designated participant has spoken less than the others of the three or more designated participants during the designated period of time; and
    adding a designated video stream of the identified other participant to the polyptych view in response to determining that the identified other participant speaks for at least the threshold duration of time.

5. The method of claim 1, wherein selecting the three or more designated participants comprises:
    selecting a first designated participant who has a first priority from the participants based on the first designated participant speaking for at least a first threshold duration of time that is associated with the first priority; and
    selecting a second designated participant who has a second priority from the participants based on the second designated participant speaking for at least a second threshold duration of time that is associated with the second priority;

wherein the second priority is greater than the first priority; and wherein the second threshold duration of time is less than the first threshold duration of time.

6. The method of claim 1, further comprising:

determining that an identified other participant from the participants speaks for at least a threshold duration of time in response to combining the three or more designated video streams to form the polyptych view;

determining that a first designated participant of the three or more designated participants has a first priority;

determining that a second designated participant of the three or more designated participants has a second priority that is less than the first priority;

removing the designated video stream of the second designated participant from the polyptych view in response to determining that the identified other participant speaks for at least the threshold duration of time and further in response to the second priority of the second designated participant being less than the first priority of the first designated participant; and adding a designated video stream of the identified other participant to the polyptych view in response to determining that the identified other participant speaks for at least the threshold duration of time.

7. The method of claim 1, further comprising:

sending the one or more portions of the 360-degree video stream of the one or more respective designated first participants and not other portions of the 360-degree video stream of other respective first participants via a network to the computing device of the specified participant;

determining that the specified participant selects an identified first participant from the plurality of first participants to be included in the polyptych view; and sending all of the plurality of portions of the 360-degree video stream via the network to the computing device of the specified participant in response to the determination.

8. The method of claim 7, further comprising:

comparing a first duration of time since the specified participant selects the identified first participant to a duration threshold; and resuming sending the one or more portions of the 360-degree video stream of the one or more respective designated first participants and not the other portions of the 360-degree video stream of the other respective first participants via the network to the computing device of the specified participant in response to the first duration of time being greater than or equal to the duration threshold.

9. A system to provide a polyptych view that includes three or more designated video streams, the system comprising:

selection logic configured to select three or more designated participants from participants of a video conference based on at least one of a priority of each participant or a speaker metric of each participant, the participants including a plurality of first participants and one or more second participants, the plurality of first participants are in a field of view of a 360-degree camera that is configured to provide a 360-degree video stream that includes a plurality of portions that correspond to the plurality of respective first participants based on the field of view, the one or more second participants are not in the field of view of the 360-degree camera, the three or more designated participants including one or more designated first participants of the plurality of first participants;

division logic configured to divide the 360-degree video stream into the plurality of portions based on the plurality of respective first participants; and combination logic configured to combine the three or more designated video streams of the three or more respective designated participants to form the polyptych view for presentation on a display of a computing device of a specified participant that is included in the one or more second participants, the three or more designated video streams comprising one or more first video streams of the one or more respective designated first participants, the one or more first video streams being one or more respective portions of the plurality of portions of the 360-degree video stream, the combination logic comprising:

inclusion determination logic configured to determine whether each portion of the plurality of portions is to be included in the polyptych view based on whether the three or more designated participants include the first participant to which the respective portion corresponds.

10. The system of claim 9, wherein the one or more second participants include a plurality of second participants;

wherein the three or more designated participants further include at least one designated second participant of the plurality of second participants; and wherein the at least one designated second participant does not include the specified participant.

11. The system of claim 9, wherein the selection logic is further configured to determine whether an identified designated participant of the three or more designated participants does not speak for at least a threshold duration of time; and wherein the combination logic comprises:

removal logic configured to remove the designated video stream of the identified designated participant from the polyptych view in response to a determination that the identified designated participant does not speak for at least the threshold duration of time.

12. The system of claim 9, wherein the selection logic is further configured to determine whether an identified other participant from the participants speaks for at least a threshold duration of time in response to the three or more designated video streams being combined to form the polyptych view;

wherein the selection logic is further configured to determine whether an identified designated participant of the three or more designated participants has spoken less than others of the three or more designated participants during a designated period of time; and wherein the combination logic comprises:

removal logic configured to remove the designated video stream of the identified designated participant from the polyptych view in response to a determination that the identified other participant speaks for at least the threshold duration of time and further in response to a determination that the identified designated participant has spoken less than the others of the three or more designated participants during the designated period of time; and addition logic configured to add a designated video stream of the identified other participant to the polyptych view in response to the determination that the identified other participant speaks for at least the threshold duration of time.

13. The system of claim 9, wherein the selection logic is configured to select a first designated participant who has a first priority from the participants based on the first designated participant speaking for at least a first threshold duration of time that is associated with the first priority;
   wherein the selection logic is configured to select a second designated participant who has a second priority from the participants based on the second designated participant speaking for at least a second threshold duration of time that is associated with the second priority;
   wherein the second priority is greater than the first priority; and
   wherein the second threshold duration of time is less than the first threshold duration of time.

14. The system of claim 9, wherein the selection logic is further configured to determine whether an identified other participant from the participants speaks for at least a threshold duration of time in response to the three or more designated video streams being combined to form the polyptych view;
   wherein the selection logic is configured to determine that a first designated participant of the three or more designated participants has a first priority;
   wherein the selection logic is configured to determine that a second designated participant of the three or more designated participants has a second priority that is less than the first priority; and
   wherein the combination logic comprises:
      removal logic configured to remove the designated video stream of the second designated participant from the polyptych view in response to a determination that the identified other participant speaks for at least the threshold duration of time and further in response to the second priority of the second designated participant being less than the first priority of the first designated participant; and
      addition logic configured to add a designated video stream of the identified other participant to the polyptych view in response to the determination that the identified other participant speaks for at least the threshold duration of time.

15. The system of claim 9, wherein the combination logic comprises:
   provision logic configured to send the one or more portions of the 360-degree video stream of the one or more respective designated first participants and not other portions of the 360-degree video stream of other respective first participants via a network to the computing device of the specified participant; and
   identification logic configured to determine that the specified participant selects an identified first participant from the plurality of first participants to be included in the polyptych view; and
   wherein the provision logic is further configured to send all of the plurality of portions of the 360-degree video stream via the network to the computing device of the specified participant in response to a determination that the specified participant selects the identified first participant.

16. The system of claim 15, wherein the combination logic comprises:
   comparison logic configured to compare a first duration of time since the specified participant selects the identified first participant to a duration threshold; and
   wherein the provision logic is further configured to resume sending the one or more portions of the 360-degree video stream of the one or more respective designated first participants and not the other portions of the 360-degree video stream of the other respective first participants via the network to the computing device of the specified participant in response to the first duration of time being greater than or equal to the duration threshold.

17. The system of claim 9, wherein the plurality of first participants are arranged in a specified order in the field of view;
   wherein the combination logic comprises:
      provision logic configured to provide three or more instances of identifying information that identify the three or more respective designated participants for presentation on the display proximate the three or more respective designated video streams;
   wherein the system further comprises:
      identification logic configured to determine whether an arrangement of the plurality of first participants in the field of view is changed from the specified order to a revised order; and
   wherein the provision logic is configured to maintain the three or more instances of identifying information on the display proximate the three or more respective designated video streams in response to a determination that the arrangement of the plurality of first participants in the field of view is changed from the specified order to the revised order.

18. A system to provide a polyptych view that includes three or more designated video streams, the system comprising:
   selection logic configured to select three or more designated participants from participants of a video conference based on at least one of a priority of each participant or a speaker metric of each participant, the participants including a plurality of first participants and one or more second participants, the plurality of first participants are in a field of view of a 360-degree camera that is configured to provide a 360-degree video stream that includes a plurality of portions that correspond to the plurality of respective first participants based on the field of view, the one or more second participants are not in the field of view of the 360-degree camera, the three or more designated participants including one or more designated first participants of the plurality of first participants; and
   combination logic configured to combine the three or more designated video streams of the three or more respective designated participants to form the polyptych view for presentation on a display of a computing device of a specified participant that is included in the one or more second participants, the three or more designated video streams comprising one or more first video streams of the one or more respective designated first participants, the one or more first video streams being one or more respective portions of the plurality of portions of the 360-degree video stream;
   wherein the selection logic is further configured to determine whether an identified other participant from the participants speaks for at least a threshold duration of time in response to the three or more designated video streams being combined to form the polyptych view;
   wherein the selection logic is further configured to determine whether an identified designated participant of the three or more designated participants has spoken less than others of the three or more designated participants during a designated period of time; and wherein the combination logic comprises:

removal logic configured to remove the designated video stream of the identified designated participant from the polyptych view in response to a determination that the identified other participant speaks for at least the threshold duration of time and further in response to a determination that the identified designated participant has spoken less than the others of the three or more designated participants during the designated period of time; and addition logic configured to add a designated video stream of the identified other participant to the polyptych view in response to the determination that the identified other participant speaks for at least the threshold duration of time.

19. A system to provide a polyptych view that includes three or more designated video streams, the system comprising:

selection logic configured to select three or more designated participants from participants of a video conference based on at least one of a priority of each participant or a speaker metric of each participant, the participants including a plurality of first participants and one or more second participants, the plurality of first participants are in a field of view of a 360-degree camera that is configured to provide a 360-degree video stream that includes a plurality of portions that correspond to the plurality of respective first participants based on the field of view, the one or more second participants are not in the field of view of the 360-degree camera, the three or more designated participants including one or more designated first participants of the plurality of first participants; and combination logic configured to combine the three or more designated video streams of the three or more respective designated participants to form the polyptych view for presentation on a display of a computing device of a specified participant that is included in the one or more second participants, the three or more designated video streams comprising one or more first video streams of the one or more respective designated first participants, the one or more first video streams being one or more respective portions of the plurality of portions of the 360-degree video stream;

wherein the selection logic is further configured to determine whether an identified other participant from the participants speaks for at least a threshold duration of time in response to the three or more designated video streams being combined to form the polyptych view;

wherein the selection logic is configured to determine that a first designated participant of the three or more designated participants has a first priority;

wherein the selection logic is configured to determine that a second designated participant of the three or more designated participants has a second priority that is less than the first priority; and wherein the combination logic comprises:

removal logic configured to remove the designated video stream of the second designated participant from the polyptych view in response to a determination that the identified other participant speaks for at least the threshold duration of time and further in response to the second priority of the second designated participant being less than the first priority of the first designated participant; and addition logic configured to add a designated video stream of the identified other participant to the polyptych view in response to the determination that the identified other participant speaks for at least the threshold duration of time.

20. A system to provide a polyptych view that includes three or more designated video streams, the system comprising:

selection logic configured to select three or more designated participants from participants of a video conference based on at least one of a priority of each participant or a speaker metric of each participant, the participants including a plurality of first participants and one or more second participants, the plurality of first participants are in a field of view of a 360-degree camera that is configured to provide a 360-degree video stream that includes a plurality of portions that correspond to the plurality of respective first participants based on the field of view, the one or more second participants are not in the field of view of the 360-degree camera, the three or more designated participants including one or more designated first participants of the plurality of first participants; and combination logic configured to combine the three or more designated video streams of the three or more respective designated participants to form the polyptych view for presentation on a display of a computing device of a specified participant that is included in the one or more second participants, the three or more designated video streams comprising one or more first video streams of the one or more respective designated first participants, the one or more first video streams being one or more respective portions of the plurality of portions of the 360-degree video stream;

wherein the combination logic comprises:

provision logic configured to send the one or more portions of the 360-degree video stream of the one or more respective designated first participants and not other portions of the 360-degree video stream of other respective first participants via a network to the computing device of the specified participant; and identification logic configured to determine that the specified participant selects an identified first participant from the plurality of first participants to be included in the polyptych view; and wherein the provision logic is further configured to send all of the plurality of portions of the 360-degree video stream via the network to the computing device of the specified participant in response to a determination that the specified participant selects the identified first participant.

21. The system of claim 20, wherein the combination logic comprises:

comparison logic configured to compare a first duration of time since the specified participant selects the identified first participant to a duration threshold; and wherein the provision logic is further configured to resume sending the one or more portions of the 360-degree video stream of the one or more respective designated first participants and not the other portions of the 360-degree video stream of the other respective first participants via the network to the computing device of the specified participant in response to the first duration of time being greater than or equal to the duration threshold.

* * * * *